US012771778B2

(12) United States Patent
Lin et al.

(10) Patent No.: US 12,771,778 B2
(45) Date of Patent: Oct. 20, 2026

(54) MESSAGE TRANSMISSION METHOD AND CORRESPONDING TERMINAL

(71) Applicant: Huawei Technologies Co., Ltd., Shenzhen (CN)

(72) Inventors: Zijie Lin, Shenzhen (CN); Ruolan Zhang, Shenzhen (CN); Feng Qian, Shanghai (CN); Daoyang Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 18/552,285

(22) PCT Filed: Mar. 10, 2023

(86) PCT No.: PCT/CN2023/080660

§ 371 (c)(1),
(2) Date: Sep. 25, 2023

(87) PCT Pub. No.: WO2023/174161

PCT Pub. Date: Sep. 21, 2023

(65) Prior Publication Data

US 2024/0048651 A1 Feb. 8, 2024

(30) Foreign Application Priority Data

Mar. 18, 2022 (CN) ......................... 202210270407.0

(51) Int. Cl.

| | |
|---|---|
| ***H04W 64/00*** | (2009.01) |
| ***H04M 1/72436*** | (2021.01) |
| *H04W 84/06* | (2009.01) |

(52) U.S. Cl.
CPC ..... *H04M 1/72436* (2021.01); *H04W 64/003* (2013.01); *H04W 84/06* (2013.01)

(58) Field of Classification Search
CPC ............... H04B 7/1851; H04B 7/1853; H04M 1/72436; H04M 1/72457; H04W 84/06; H04W 4/14; H04W 64/003
See application file for complete search history.

(56) References Cited

U.S. PATENT DOCUMENTS

2002/0006117 A1 1/2002 Duske et al.
2009/0267829 A1 * 10/2009 Mitchell ............... G01S 5/0027 342/357.48

(Continued)

FOREIGN PATENT DOCUMENTS

CN 1678090 A 10/2005
CN 101938287 A 1/2011

(Continued)

*Primary Examiner* — Khalid W Shaheed
(74) *Attorney, Agent, or Firm* — Slater Matsil, LLP

(57) ABSTRACT

The terminal displays a satellite-searching guide interface, where the satellite-searching guide interface includes a satellite identifier, a display location of the satellite identifier on the satellite-searching guide interface indicates a location relationship between the terminal and a target satellite; the terminal updates the display location of the satellite identifier in response to an operation that a user moves the terminal; and if a location relationship between the moved terminal and the target satellite meets a message transmission condition, the terminal sends a satellite message to the target satellite or receives a satellite message from the target satellite.

25 Claims, 40 Drawing Sheets

(56) References Cited

U.S. PATENT DOCUMENTS

| | | | | |
|---|---|---|---|---|
| 2015/0091752 | A1* | 4/2015 | Muraki | G01S 19/258<br>342/357.63 |
| 2017/0038742 | A1* | 2/2017 | Honda | G04R 20/04 |
| 2021/0027351 | A1 | 1/2021 | Chamarti | |

FOREIGN PATENT DOCUMENTS

| | | | | |
|---|---|---|---|---|
| CN | 103064429 | A | 4/2013 | |
| CN | 103682632 | A | 3/2014 | |
| CN | 106211040 | A | 12/2016 | |
| CN | 106569229 | A | 4/2017 | |
| CN | 111026167 | A * | 4/2020 | G05D 3/12 |
| CN | 111082223 | A | 4/2020 | |
| CN | 212585688 | U | 2/2021 | |
| CN | 113271558 | A | 8/2021 | |
| CN | 113498127 | A | 10/2021 | |
| CN | 114071348 | A | 2/2022 | |
| CN | 115706601 | A | 2/2023 | |
| WO | 2015127881 | A1 | 9/2015 | |

* cited by examiner

MESSAGE TRANSMISSION METHOD AND CORRESPONDING TERMINAL

CROSS-REFERENCE TO RELATED APPLICATIONS

This application is a national stage of International Application No. PCT/CN2023/080660, filed on Mar. 10, 2023, which claims priority to Chinese Patent Application No. 202210270407.0 filed on Mar. 18, 2022. Both of the aforementioned applications are hereby incorporated by reference in their entireties.

TECHNICAL FIELD

This application relates to the field of communication technologies, and in specific, to a message transmission method and a corresponding terminal.

BACKGROUND

A short message (short message) service is a basic service for communication of terminals (for example, mobile phones). Generally, a sending terminal sends a short message via an access network device (for example, a first base station), a network forwards the short message to an access network device (for example, a second base station) accessed by a receiving terminal, and the second base station sends the short message to the receiving terminal.

SUMMARY

This application provides a message transmission method, to guide a user by using a satellite-searching guide interface to adjust a location relationship between a terminal and a target satellite, so that the terminal can quickly send or receive a satellite message. This application further provides a corresponding terminal, a computer-readable storage medium, a computer program product, and the like.

A first aspect of this application provides a message transmission method, applied to a terminal, and including: displaying a satellite-searching guide interface, where the satellite-searching guide interface includes a satellite identifier, and a display location of the satellite identifier on the satellite-searching guide interface indicates a location relationship between the terminal and a target satellite; updating the display location of the satellite identifier in response to an operation that a user moves the terminal; and if a location relationship between the moved terminal and the target satellite meets a message transmission condition, sending a first satellite message to the target satellite or receiving a first satellite message from the target satellite.

In this application, the satellite-searching guide interface is used to guide the user to adjust a location of the terminal. The user may determine the location relationship between the terminal and the target satellite based on the display location of the satellite identifier on the satellite-searching guide interface, to move the terminal (for example, move the terminal leftward or rightward, or move the terminal upward or downward), and the terminal may adjust the display location of the satellite identifier on the satellite-searching guide interface in response to the movement.

In this application, that the location relationship between the moved terminal and the target satellite meets the message transmission condition may be that the location relationship between the moved terminal and the target satellite enables the terminal to establish a communication connection to the target satellite.

In this application, the satellite message is a message directly sent by the terminal to a satellite, or a message directly sent by a satellite to the terminal, and does not need to be forwarded by a base station.

In the first aspect, the terminal may guide, by using the satellite-searching guide interface, the user to adjust the location relationship between the terminal and the target satellite, so that the terminal can quickly establish the communication connection to the satellite. In this way, the terminal can quickly send or receive a satellite message.

In a possible implementation of the first aspect, the satellite-searching guide interface further includes satellite-searching prompt information, and the satellite-searching prompt information is used to prompt the user of a direction of moving the terminal.

In this possible implementation, the satellite-searching prompt information is used to prompt the user of the direction of moving the terminal. For example, the satellite-searching prompt information is moving the terminal leftward, moving the terminal rightward, moving the terminal upward, or moving the terminal downward. The satellite-searching prompt information is usually a prompt given by the terminal based on a shortest moving path. In this way, when the user moves the terminal based on the satellite-searching prompt information, the terminal can be quickly moved to a location suitable for establishing the communication connection to the target satellite. This increases a speed at which the terminal sends a satellite message to the target satellite or receives a satellite message from the target satellite.

In a possible implementation of the first aspect, the satellite-searching guide interface includes a first satellite-searching guide interface and a second satellite-searching guide interface. The first satellite-searching guide interface includes a first satellite identifier and a first alignment area, the first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite-searching guide interface includes a second satellite identifier and a second alignment area, the second satellite identifier indicates a location relationship between the terminal and the target satellite in a pitch angle, and when the location relationship between the terminal and the target satellite in the pitch angle meets the message transmission condition, the second satellite identifier is located in the second alignment area.

In this possible implementation, a satellite identifier and an alignment area are set from two dimensions: the azimuth and the pitch angle between the terminal and the target satellite. In this way, when the location of the terminal is adjusted, the location relationship between the terminal and the target satellite in the azimuth and the location relationship between the terminal and the target satellite in the pitch angle may be adjusted based on the satellite identifier and the alignment area on the first satellite-searching guide interface and the second satellite-searching guide interface respectively, so that a speed of establishing the communication connection between the terminal and the target satellite can be increased.

In a possible implementation of the first aspect, the displaying a satellite-searching guide interface, and the updating the display location of the satellite identifier in response to an operation that a user moves the terminal specifically include: displaying the first satellite-searching guide interface, and updating a display location of the first satellite identifier in response to an operation that the user moves the terminal leftward or rightward; when the first satellite identifier is located in the first alignment area, displaying the second satellite-searching guide interface; and updating a display location of the second satellite identifier in response to an operation that the user moves the terminal upward or downward.

In this possible implementation, based on a display sequence of the terminal, the first satellite-searching guide interface is first displayed. When the first satellite identifier is located in the first alignment area, that is, after the terminal is aligned with the target satellite in the azimuth, the second satellite-searching guide interface is displayed. The second satellite-searching guide interface may not include the first satellite identifier and the first alignment area, or may include the first satellite identifier and the first alignment area. It can be learned from this implementation that, for the satellite-searching guide interface, this application provides diversified presentation manners.

In a possible implementation of the first aspect, the displaying a satellite-searching guide interface, and the updating the display location of the satellite identifier in response to an operation that a user moves the terminal specifically include: displaying the second satellite-searching guide interface, and updating a display location of the second satellite identifier in response to an operation that the user moves the terminal upward or downward; when the second satellite identifier is located in the second alignment area, displaying the first satellite-searching guide interface; and updating a display location of the first satellite identifier in response to an operation that the user moves the terminal leftward or rightward.

In this possible implementation, based on a display sequence of the terminal, the second satellite-searching guide interface is first displayed. When the second satellite identifier is located in the second alignment area, that is, after the terminal is aligned with the target satellite in the pitch angle, the first satellite-searching guide interface is displayed. The first satellite-searching guide interface may not include the second satellite identifier and the second alignment area, or may include the second satellite identifier and the second alignment area. It can be learned from this implementation that, for the satellite-searching guide interface, this application provides diversified presentation manners.

In a possible implementation of the first aspect, the satellite-searching guide interface includes a first satellite identifier, a first alignment area, a second satellite identifier, and a second alignment area. The first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite identifier indicates a location relationship between the terminal and the target satellite in a pitch angle, and when the location relationship between the terminal and the target satellite in the pitch angle meets the message transmission condition, the second satellite identifier is located in the second alignment area.

In this possible implementation, a satellite identifier and an alignment area are set from two dimensions: the azimuth and the pitch angle between the terminal and the target satellite. In this way, when the location of the terminal is adjusted, the location relationship between the terminal and the target satellite in the azimuth and the location relationship between the terminal and the target satellite in the pitch angle may be adjusted based on the satellite identifier and the alignment area on the satellite-searching guide interface respectively, so that a speed of establishing the communication connection between the terminal and the target satellite can be increased.

In a possible implementation of the first aspect, the updating the display location of the satellite identifier in response to an operation that a user moves the terminal specifically includes: updating a display location of the first satellite identifier in response to an operation that the user moves the terminal leftward or rightward; or updating a display location of the second satellite identifier in response to an operation that the user moves the terminal upward or downward.

In this possible implementation, when the satellite-searching guide interface includes the first satellite identifier and the first alignment area, and the second satellite identifier and the second alignment area, the user may first move the terminal leftward or rightward to adjust the location relationship between the terminal and the target satellite in the azimuth, and then move the terminal upward or downward to adjust the location relationship between the terminal and the target satellite in the pitch angle. Alternatively, the user may first move the terminal upward or downward to adjust the location relationship between the terminal and the target satellite in the pitch angle, and then move the terminal leftward or rightward to adjust the location relationship between the terminal and the target satellite in the azimuth. Alternatively, the user may adjust the location relationships in the azimuth and in the pitch angle at the same time, for example, may move the terminal toward the upper left or lower left, or move the terminal toward the upper right or lower right. The user may move the terminal based on guidance of the satellite-searching prompt information displayed on the terminal. It can be learned from this implementation that, for the satellite-searching guide interface, this application provides diversified presentation manners.

In a possible implementation of the first aspect, when the display location of the first satellite identifier is outside the first alignment area, the first alignment area is displayed in a first color; and when the display location of the first satellite identifier is in the first alignment area, the first alignment area is displayed in a second color, and the first color is different from the second color.

In this possible implementation, a color change may indicate that locations of the terminal and the target satellite in the azimuth have been adjusted, so that the user can better be prompted that the terminal has been moved to a proper location in the leftward or rightward direction.

In a possible implementation of the first aspect, when the display location of the second satellite identifier is outside the second alignment area, the second alignment area is displayed in a third color; and when the display location of the second satellite identifier is in the second alignment area, the second alignment area is displayed in a fourth color, and the third color is different from the fourth color.

In this possible implementation, a color change may indicate that locations of the terminal and the target satellite in the pitch angle have been adjusted, so that the user can better be prompted that the terminal has been moved to a proper location in the upward or downward direction.

In a possible implementation of the first aspect, when the terminal is configured to send the first satellite message, before the displaying a satellite-searching guide interface, the method further includes: displaying a satellite message editing interface in response to an operation that the user creates a satellite message or replies to a satellite message, where the satellite message editing interface is used by the user to input content of the first satellite message.

In this possible implementation, a satellite message function may be configured on Messaging or another communication application on the terminal, so as to send a satellite message.

In a possible implementation of the first aspect, the displaying a satellite-searching guide interface specifically includes: displaying the satellite-searching guide interface in response to an operation that the user sends the first satellite message.

In this possible implementation, the terminal displays, in response to the operation that the user sends the first satellite message, the satellite-searching guide interface, so that the user performs a satellite-searching guide process in the plurality of implementations described above.

In a possible implementation of the first aspect, when the terminal is configured to receive the first satellite message, the displaying a satellite-searching guide interface specifically includes: displaying the satellite-searching guide interface in response to an operation that the user receives a satellite message.

In this possible implementation, when the satellite message is received, the terminal displays, in response to the operation that the user receives the satellite message, the satellite-searching guide interface, so that the user performs a satellite-searching guide process in the plurality of implementations described above.

In a possible implementation of the first aspect, when the terminal is configured to send the first satellite message, before the displaying a satellite-searching guide interface, the method further includes: sending a common message to a base station; receiving a response message indicating that the common message fails to be sent; and the displaying a satellite-searching guide interface specifically includes: displaying the satellite-searching guide interface in response to the response message indicating that the common message fails to be sent.

In this possible implementation, the common message is a message sent by using the base station. After the common message fails to be sent, content of the common message can be transferred to the satellite message editing interface, so that the content of the common message can be sent through a satellite message. In this way, a success rate of sending a message can be increased.

In a possible implementation of the first aspect, after the sending a first satellite message, the method further includes: in response to an operation that the user sends the second satellite message, determining a location change after the terminal sends the first satellite message; and if the location change after the terminal sends the first satellite message is less than a first threshold, sending the second satellite message to the target satellite, and skipping displaying the satellite-searching guide interface.

In this possible implementation, the first threshold may be preconfigured. When the first satellite message is sent, the user adjusts the location relationship between the terminal and the target satellite, and establishes the communication connection between the terminal and the target satellite. The user may be kept at a location to send the second satellite message to a same recipient or different recipients, and the satellite-searching guide interface does not need to be displayed. In this way, a speed of sending a satellite message can be increased.

In addition, in a possible implementation, after the sending a first satellite message, the method further includes: in response to an operation that the user sends the second satellite message, determining time when the terminal sends the first satellite message; and if a difference between the time when the terminal sends the first satellite message and time when the user triggers the operation of sending the second satellite message is less than a second threshold, sending the second satellite message to the target satellite, and skipping displaying the satellite-searching guide interface.

In a possible implementation of the first aspect, after the sending a first satellite message to the target satellite, the method further includes: receiving a response message indicating that the first satellite message fails to be sent; and displaying the satellite-searching guide interface based on the response message indicating that the first satellite message fails to be sent.

In this possible implementation, if the first satellite message fails to be sent, it indicates that the communication connection between the terminal and the target satellite is disconnected or a signal is poor, and the location relationship between the terminal and the target satellite needs to be adjusted again.

A second aspect of this application provides a terminal, including:z a display unit, configured to display a satellite-searching guide interface, where the satellite-searching guide interface includes a satellite identifier, and a display location of the satellite identifier on the satellite-searching guide interface indicates a location relationship between the terminal and a target satellite;

a processing unit, configured to update the display location of the satellite identifier displayed by the display unit in response to an operation that the user moves the terminal; and a transceiver unit, configured to, if a location relationship between the moved terminal and the target satellite meets a message transmission condition, send a first satellite message to the target satellite or receive a first satellite message from the target satellite.

In a possible implementation of the second aspect, the satellite-searching guide interface further includes satellite-searching prompt information, and the satellite-searching prompt information is used to prompt the user of a direction of moving the terminal.

In a possible implementation of the second aspect, the satellite-searching guide interface includes a first satellite-searching guide interface and a second satellite-searching guide interface. The first satellite-searching guide interface includes a first satellite identifier and a first alignment area, the first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite-searching guide interface includes a second satellite identifier and a second alignment area. The second satellite identifier indicates a location relationship between the terminal and the target satellite in a pitch angle, and when the location relationship between the terminal and the target satellite in the pitch angle meets the message transmission condition, the second satellite identifier is located in the second alignment area.

In a possible implementation of the second aspect, the display unit is specifically configured to display the first satellite-searching guide interface.

The processing unit is specifically configured to update a display location of the first satellite identifier in response to an operation that the user moves the terminal leftward or rightward.

The display unit is specifically configured to display the second satellite-searching guide interface when the first satellite identifier is located in the first alignment area.

The processing unit is specifically configured to update a display location of the second satellite identifier in response to an operation that the user moves the terminal upward or downward.

In a possible implementation of the second aspect, the display unit is specifically configured to display the second satellite-searching guide interface.

The processing unit is specifically configured to update the display location of the second satellite identifier in response to the operation that the user moves the terminal upward or downward.

The display unit is specifically configured to display the first satellite-searching guide interface when the second satellite identifier is located in the second alignment area.

The processing unit is specifically configured to update the display location of the first satellite identifier in response to the operation that the user moves the terminal leftward or rightward.

In a possible implementation of the second aspect, the satellite-searching guide interface includes a first satellite identifier, a first alignment area, a second satellite identifier, and a second alignment area. The first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite identifier indicates a location relationship between the terminal and the target satellite in a pitch angle, and when the location relationship between the terminal and the target satellite in the pitch angle meets the message transmission condition, the second satellite identifier is located in the second alignment area.

In a possible implementation of the second aspect, the processing unit is specifically configured to: update the display location of the first satellite identifier in response to operation that the user moves the terminal leftward or rightward; and update the display location of the second satellite identifier in response to the operation that the user moves the terminal upward or downward.

In a possible implementation of the second aspect, when the display location of the first satellite identifier is outside the first alignment area, the first alignment area is displayed in a first color; and when the display location of the first satellite identifier is in the first alignment area, the first alignment area is displayed in a second color, and the first color is different from the second color.

In a possible implementation of the second aspect, when the display location of the second satellite identifier is outside the second alignment area, the second alignment area is displayed in a third color; and when the display location of the second satellite identifier is in the second alignment area, the second alignment area is displayed in a fourth color, and the third color is different from the fourth color.

In a possible implementation of the second aspect, the display unit is further configured to: when the terminal is configured to send the first satellite message and before the satellite-searching guide interface is displayed, display a satellite message editing interface in response to an operation that the user creates a satellite message or replies to a satellite message, where the satellite message editing interface is used by the user to input content of the first satellite message.

In a possible implementation of the second aspect, the display unit is specifically configured to display the satellite-searching guide interface in response to an operation that the user sends the first satellite message.

In a possible implementation of the second aspect, the display unit is specifically configured to display the satellite-searching guide interface in response to an operation that the user receives a satellite message.

In a possible implementation of the second aspect, the transceiver unit is further configured to: send a common message to a base station; and receive a response message indicating that the common message fails to be sent.

The display unit is specifically configured to display the satellite-searching guide interface in response to the response message indicating that the common message fails to be sent.

In a possible implementation of the second aspect, the processing unit is further configured to: in response to an operation that the user sends the second satellite message, determine a location change after the terminal sends the first satellite message.

The transceiver unit is further configured to: if the location change after the terminal sends the first satellite message is less than a first threshold, send the second satellite message to the target satellite, and skip displaying the satellite-searching guide interface.

In a possible implementation of the second aspect, the transceiver unit is further configured to receive a response message indicating that the first satellite message fails to be sent.

The display unit is further configured to display the satellite-searching guide interface based on the response message indicating that the first satellite message fails to be sent.

A third aspect of this application provides a terminal. The terminal is configured to perform the method according to any one of the first aspect or the possible implementations of the first aspect.

A fourth aspect of this application provides a chip system. The chip system includes one or more interface circuits and one or more processors. The interface circuit and the processor are interconnected by using a line. The interface circuit is configured to receive a signal from a memory of the terminal, and send a signal to the processor, where the signal includes computer instructions stored in the memory. When the processor executes the computer instructions, the terminal performs the method according to any one of the first aspect or the possible implementations of the first aspect.

A fifth aspect of this application provides a computer-readable storage medium. The computer-readable storage medium stores a computer program or instructions. When the computer program or the instructions are run on a computer, the computer is enabled to perform the method according to any one of the first aspect or the possible implementations of the first aspect.

A sixth aspect of this application provides a computer program product. The computer program product includes computer program code. When the computer program code is executed on a computer, the computer is enabled to perform the method according to any one of the first aspect or the possible implementations of the first aspect.

For technical effects brought by the second aspect, the third aspect, the fourth aspect, the fifth aspect, the sixth aspect, or any one of the possible implementations, refer to technical effects brought by the first aspect or the different possible implementations of the first aspect. Details are not described herein again.

DETAILED DESCRIPTION OF ILLUSTRATIVE EMBODIMENTS

The following describes embodiments of this application with reference to the accompanying drawings. It is clear that the described embodiments are merely some rather than all of embodiments of this application. A person of ordinary skill in the art may learn that, with development of technologies and emergence of new scenarios, the technical solutions provided in embodiments of in this application are also applicable to similar technical problems.

In the specification, claims, and accompanying drawings of this application, the terms "first", "second", and so on are intended to distinguish between similar objects but do not necessarily indicate a specific order or sequence. It should be understood that the data termed in such a way is interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Embodiments of this application provide a message transmission method, to guide a user by using a satellite-searching guide interface to adjust a location relationship between a terminal and a target satellite, so that the terminal can quickly send or receive a satellite message. This application further provides a corresponding terminal, a computer-readable storage medium, a computer program product, and the like. Details are separately described in the following.

Figure 1A:
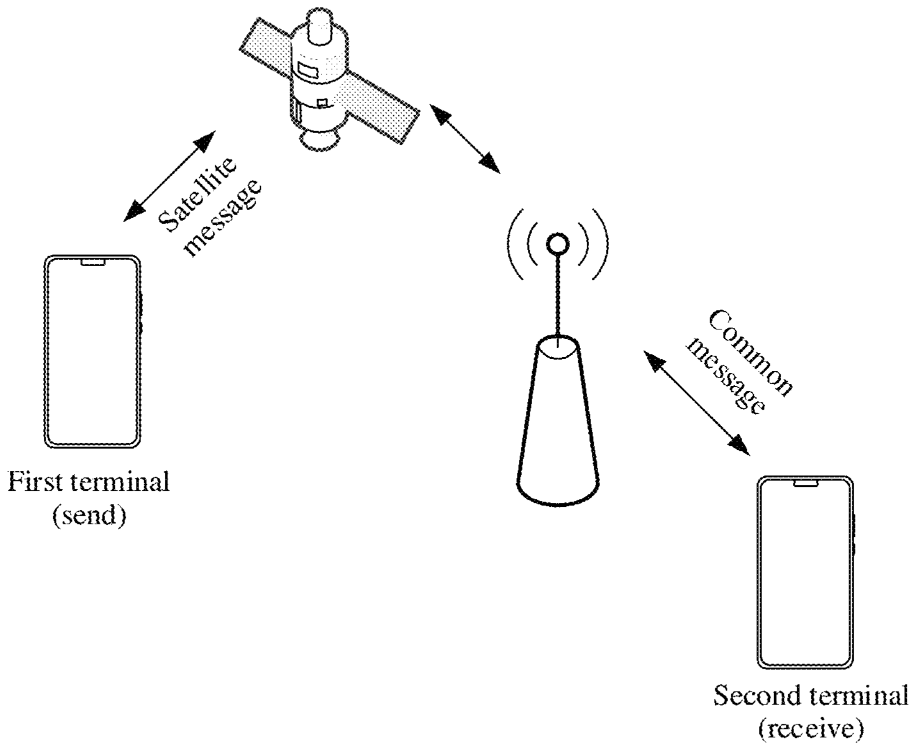
FIG. 1A is a schematic diagram of an application scenario according to an embodiment of this application.
Figure 1B:
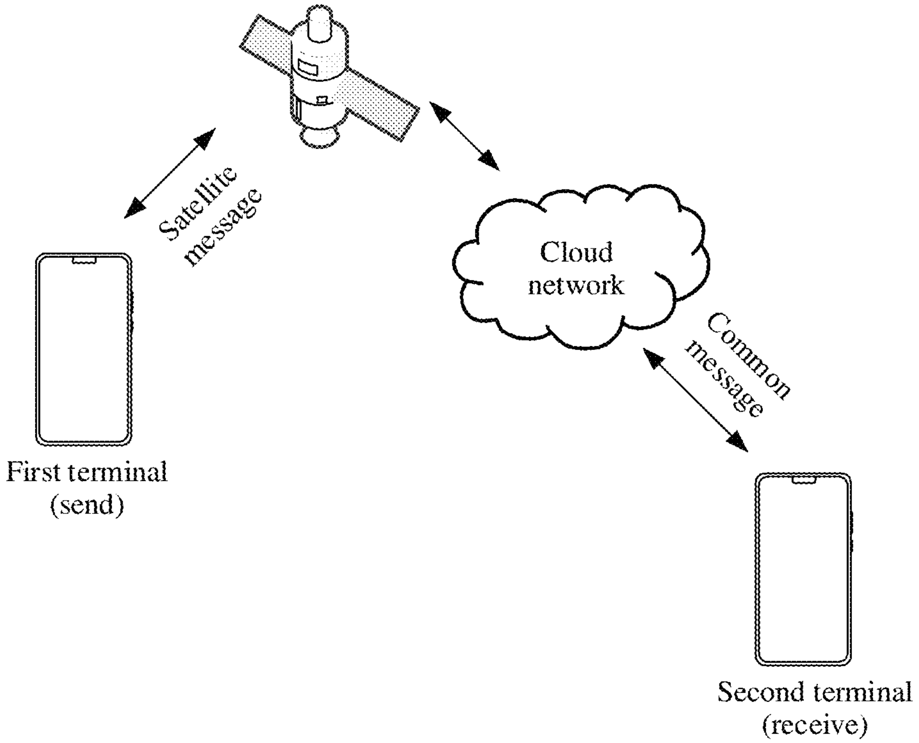
FIG. 1B is a schematic diagram of another application scenario according to an embodiment of this application.
Figure 1C:
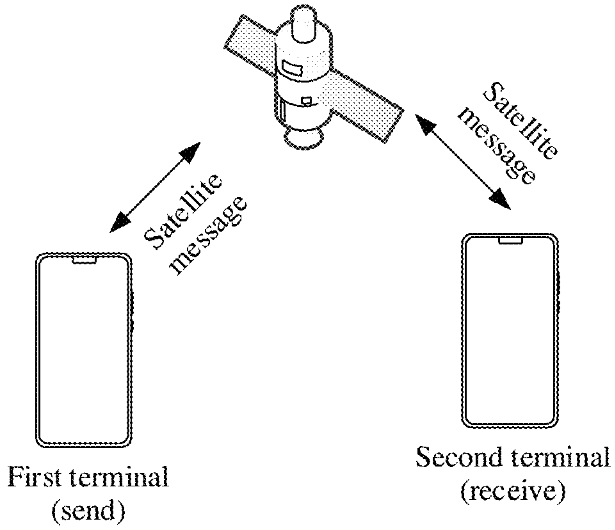
FIG. 1C is a schematic diagram of still another application scenario according to an embodiment of this application.
Figure 1D:
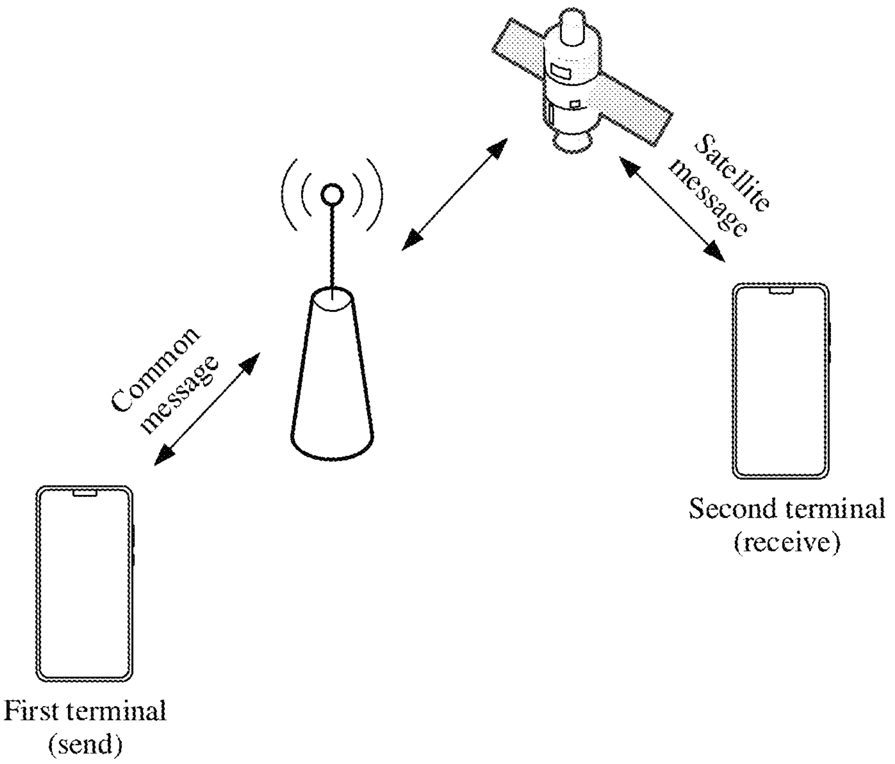
FIG. 1D is a schematic diagram of yet another application scenario according to an embodiment of this application.
Figure 1E:
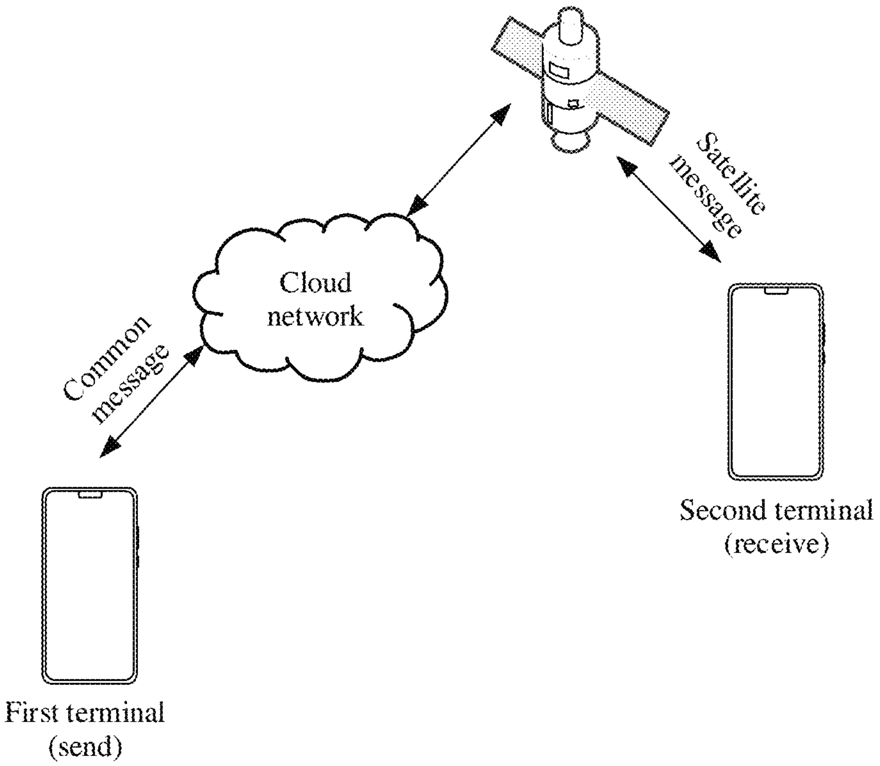
FIG. 1E is a schematic diagram of still yet another application scenario according to an embodiment of this application.

Before the method provided in embodiments of this application is described, an application scenario of the method provided in embodiments of this application is first described. Application scenarios of the method provided in embodiments of this application may be shown in FIG. 1A to FIG. 1E. FIG. 1A, FIG. 1B, and FIG. 1C show application scenarios of sending a satellite message, and FIG. 1C, FIG. 1D, and FIG. 1E show application scenarios of receiving a satellite message.

In embodiments of this application, the satellite message is a message directly sent by a terminal to a satellite, or a message directly received by a terminal from a satellite. A message that needs to be transferred between the terminal and the satellite through another device (for example, a base station or a cloud network) is referred to as a common message.

In embodiments of this application, a satellite message function item may be configured in a messaging application or another communication application of the terminal. A user may edit a satellite message on the terminal by using the satellite message function item, and perform a click-to-send operation, so that the terminal sends the satellite message to the satellite. Alternatively, a user may perform a click-to-receive operation on a satellite message on the terminal by using the satellite message function item, so that the terminal receives the satellite message from the satellite.

It should be noted that the messaging application is an application used to send or receive a short message (short message, SM), and the another communication application may be an instant messaging application or another application capable of receiving or sending a short message.

In the application scenario of sending the satellite message shown in FIG. 1A, the application scenario (or an architecture) may include a first terminal, a satellite, a base station, and a second terminal. The first terminal sends the satellite message to the satellite. After receiving the satellite message, the satellite sends content of the satellite message to the base station. The base station sends the content of the satellite message to the second terminal. After receiving the content of the satellite message, the second terminal displays the content of the satellite message as a common message.

In the application scenario of sending the satellite message shown in FIG. 1B, the application scenario (or an architecture) may include a first terminal, a satellite, a cloud network, and a second terminal. The first terminal sends the satellite message to the satellite. After receiving the satellite message, the satellite sends content of the satellite message to the cloud network. The cloud network sends the content of the satellite message to the second terminal. The second terminal receives the content of the satellite message by using the cloud network, where the content of the satellite message may be displayed in a common message of a corresponding application (app).

In the application scenario of sending the satellite message and receiving the satellite message shown in FIG. 1C, the application scenario (or an architecture) may include a first terminal, a satellite, and a second terminal. The first terminal sends the satellite message to the satellite. After receiving the satellite message, the satellite sends the satellite message to the second terminal. After receiving the satellite message from the satellite, the second terminal displays the satellite message.

In the application scenario of receiving the satellite message shown in FIG. 1D, the application scenario (or an architecture) may include a first terminal, a base station, a satellite, and a second terminal. The first terminal sends a common message to the base station, and the base station sends the common message to the satellite. After receiving the common message, the satellite sends content of the common message to the second terminal. After receiving the content of the common message, the second terminal displays the content of the common message in a form of the satellite message in the satellite message function item.

In the application scenario of receiving the satellite message shown in FIG. 1E, the application scenario (or an architecture) may include a first terminal, a satellite, a cloud network, and a second terminal. The first terminal sends a common message to the cloud network. After receiving the common message, the cloud network sends the common message to the satellite. After receiving the common message, the satellite sends the content of the common message to the second terminal. After receiving the content of the common message, the second terminal displays the content of the common message in a form of the satellite message in the satellite message function item.

In the foregoing scenarios shown in FIG. 1A to FIG. 1E, only one satellite is shown. Actually, the foregoing process may involve a plurality of satellites. Two satellites are used as an example, after one satellite receives a satellite message from the first terminal, the satellite may send the satellite message to another satellite, and the another satellite sends the satellite message to the second terminal or another device (for example, the base station or the cloud network).

Each of the first terminal and the second terminal described above may be a digital display product like a mobile phone, a tablet computer (pad), a portable game console, a personal digital assistant (personal digital assistant, PDA), a notebook computer, an ultra-mobile personal computer (ultra-mobile personal computer, UMPC), a handheld computer, a netbook, a vehicle-mounted media playback device, a wearable electronic device, a virtual reality (virtual reality, VR) terminal device, or an augmented reality (augmented reality, AR) terminal device. In embodiments of this application, only an example in which the first terminal and the second terminal are mobile phones is used for description.

Figure 2:
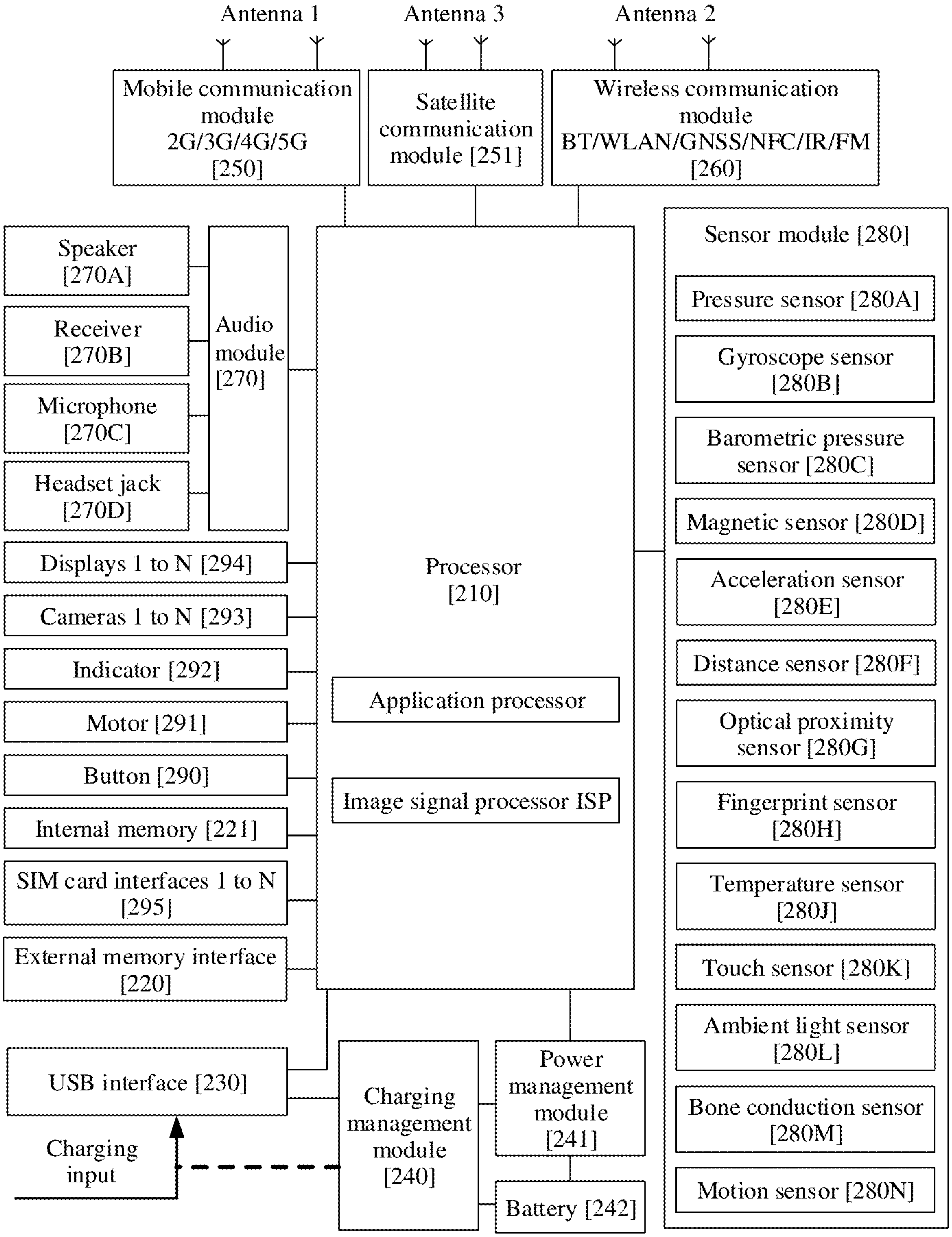
FIG. 2 is a schematic diagram of a structure of a terminal according to an embodiment of this application.

FIG. 2 is a schematic diagram of a structure of a terminal according to an embodiment of this application. As shown in FIG. 2, the terminal may include a processor 210, an external memory interface 220, an internal memory 221, a universal serial bus (universal serial bus, USB) interface 230, a charging management module 240, a power management module 241, a battery 242, an antenna 1, an antenna 2, an antenna 3, a mobile communication module 250, a satellite communication module 251, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, a motion sensor 280N, and the like.

It may be understood that an example structure in this embodiment does not constitute a specific limitation on the terminal. In some other embodiments, the terminal may include more or fewer components than those shown in the figure, or some components may be combined, or some components may be split, or there may be a different component layout. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the terminal. The controller may generate operation control signals based on instruction operation codes and time sequence signals, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment is merely an example for description, and does not constitute a limitation on the structure of the terminal. In some other embodiments, alternatively, the terminal may use an interface connection different from that in this embodiment or combine a plurality of interface connections.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive wireless charging input through a wireless charging coil of the terminal. When charging the battery 242, the charging management module 240 may further charge the terminal through the power management module 241.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display 294, the camera 293, the wireless communication module 260, and the like. The power management module 241 may be further configured to monitor parameters such as a battery capacity, a battery cycle count, and a battery health status (electric leakage or impedance). In some other embodiments, the power management module 241 may alternatively be disposed in the processor 210. In some other embodiments, the power management module 241 and the charging management module 240 may alternatively be disposed in a same device.

A wireless communication function of the terminal may be implemented by using the antenna 1, the antenna 2, the antenna 3, the mobile communication module 250, the satellite communication module 251, the wireless communication module 260, the modem processor, the baseband processor, and the like.

The antenna 1, the antenna 2, and the antenna 3 are configured to transmit and receive electromagnetic wave signals. Each antenna in the terminal may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch. The antenna 3 may be configured to transmit signals to and/or receive signals from the satellite.

The mobile communication module 250 may provide a solution that is applied to the terminal and that includes wireless communication such as 2G/3G/4G/5G. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules of the mobile communication module 250 may be disposed in the processor 210. In some embodiments, at least some functional modules of the mobile communication module 250 may be disposed in a same component as at least some modules of the processor 210.

The satellite communication module 251 may provide a solution applied to the terminal to communicate with the satellite. The satellite communication module 251 may be one or more components integrating at least one communication processor module. The satellite communication module 251 receives an electromagnetic wave by using the antenna 3, performs frequency modulation and filtering on an electromagnetic wave signal, and sends a processed signal to the processor 210. The satellite communication module 251 may further receive a to-be-sent signal from the processor 210, perform frequency modulation and amplification on the to-be-sent signal, and convert, by using the antenna 3, the signal into an electromagnetic wave for radiation.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and disposed in a same component as the mobile communication module 250 or another function module.

The wireless communication module 260 may provide a solution, applied to the terminal, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 260 may be one or more components integrating at least one communication processor module. The wireless communication module 260 receives an electromagnetic wave by using the antenna 2, performs frequency modulation and filtering on an electromagnetic wave signal, and sends a processed signal to the processor 210. The wireless communication module 260 may further receive a to-be-sent signal from the processor 210, perform frequency modulation and amplification on the signal, and convert, by using the antenna 2, the signal into an electromagnetic wave for radiation.

In some embodiments, the antenna 1 of the terminal is coupled to the mobile communication module 250, and the antenna 2 is coupled to the wireless communication module 260, so that the terminal can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal implements a display function by using the GPU, the display 294, the application processor, and the like. The GPU is a microprocessor for image processing, and is connected to the display 294 and the application processor. The GPU is configured to: perform mathematical and geometric computation, and render images. The processor 210 may include one or more GPUs that execute program instructions to generate or change display information.

The display 294 is configured to display images, videos, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a Mini LED, a Micro LED, a Micro OLED, a quantum dot light-emitting diode (quantum dot light-emitting diode, QLED), or the like.

The terminal may implement a photographing function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture static images or videos. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the terminal may include one or N cameras 293, where N is a positive integer greater than 1.

The camera 293 may be further configured to provide, by the terminal, personalized and scenario-based service experience for the user based on a perceived external environment and actions of the user. The camera 293 can obtain rich and accurate information, so that the terminal perceives the external environment and the actions of the user. Specifically, in embodiments of this application, the camera 293 may be configured to identify whether the user of the terminal is a first user or a second user.

The digital signal processor is configured to process digital signals, and may process other digital signals in addition to the digital image signals. For example, when the terminal selects a frequency, the digital signal processor is configured to perform Fourier transformation on frequency energy.

The video codec is configured to compress or decompress digital videos. The terminal may support one or more video codecs. In this way, the terminal can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a transmission mode between human brain neurons, and continuously performs self-learning. Applications such as intelligent cognition of the terminal may be implemented through the NPU, for example, image recognition, facial recognition, speech recognition, and text understanding.

The external memory interface 220 may be configured to connect to an external memory card like a micro SD card, to extend a storage capability of the terminal. The external storage card communicates with the processor 210 through the external memory interface 220, to implement a data storage function. For example, files such as music and videos are stored in the external storage card.

The internal memory 221 may be configured to store computer-executable program code, and the executable program code includes instructions. The processor 210 runs the instructions stored in the internal memory 221, to implement various function applications and data processing of the terminal. For example, in embodiments of this application, the processor 210 may execute the instructions stored in the internal memory 221, and display corresponding display content on the display in response to an operation performed by a user on the display 294. The internal memory 221 may include a program storage area and a data storage area. The program storage area may store an operating system, an application required by at least one function (for example, a voice playing function or an image playing function), and the like. The data storage area may store data (for example, audio data or a phone book) created in a process of using the terminal, and the like. In addition, the internal memory 221 may include a high-speed random access memory, or may include a nonvolatile memory like at least one disk storage device, a flash memory, or a universal flash storage (universal flash storage, UFS).

The terminal may implement audio functions such as music playback and recording through the audio module 270, the speaker 270A, the receiver 270B, the microphone 270C, the headset jack 270D, the application processor, and the like.

The audio module 270 is configured to convert digital audio information into analog audio signals for output, and is also configured to convert analog audio inputs into digital audio signals. The audio module 270 may be further configured to code and decode audio signals. In some embodiments, the audio module 270 may be disposed in the processor 210, or some function modules of the audio module 270 are disposed in the processor 210. The speaker 270A, also referred to as a "loudspeaker", is configured to convert audio electrical signals into sound signals. The terminal may be used to listen to music or answer hands-free calls through the speaker 270A. The receiver 270B, also referred to as an "earpiece", is configured to convert audio electrical signals into sound signals. When a call is answered or voice information is received through the terminal, the receiver 270B may be put close to a human ear to listen to voice. The microphone 270C, also referred to as a "mike" or a "mic", is configured to convert sound signals into electrical signals. When making a call, sending voice information, or needing to trigger, by using a voice assistant, the terminal to perform some functions, the user may make a sound by putting the microphone 270C close to the mouth, and input sound signals to the microphone 270C. At least one microphone 270C may be disposed in the terminal. In some other embodiments, two microphones 270C may be disposed in the terminal, to collect sound signals and further implement a noise reduction function. In some other embodiments, three, four, or more microphones 270C may alternatively be disposed in the terminal, to collect sound signals, reduce noise, further identify a sound source, implement a directional recording function, and the like.

The headset jack 270D is configured to connect to a wired headset. The headset jack 270D may be the USB interface 230, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 280A is configured to sense pressure signals, and may convert the pressure signals into electrical signals. In some embodiments, the pressure sensor 280A may be disposed in the display 294. There are many types of pressure sensors 280A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The terminal determines pressure strength based on the change of the capacitance. When a touch operation is performed on the display 294, the terminal detects a strength of the touch operation based on the pressure sensor 280A. The terminal may also calculate a touch position based on a detected signal of the pressure sensor 280A. In some embodiments, touch operations that are performed at a same touch position but have different touch operation strengths may correspond to different operation instructions. For example, when a touch operation whose touch operation strength is less than a pressure threshold is performed on an icon of Messaging, an instruction for viewing a short message is performed. When a touch operation whose touch operation strength is greater than or equal to the pressure threshold is performed on the icon of Messaging, an instruction for creating a new short message is performed.

The gyroscope sensor 280B may be configured to determine a motion posture of the terminal. In some embodiments, angular velocities of the terminal on three axes (namely, x, y, and z axes) may be determined by using the gyroscope sensor 280B. The gyroscope sensor 280B may be configured to implement image stabilization during photographing. For example, when a shutter is pressed, the gyroscope sensor 280B detects a shake angle of the terminal, and calculates, based on the angle, a distance that needs to be compensated for by a lens module, so that the lens counteracts a shake of the terminal through a reverse motion, thereby implementing stabilization. The gyroscope sensor 280B may also be used in a navigation scenario and a somatic game scenario. In addition, the gyroscope sensor 280B may be further configured to measure a rotation amplitude or a moving distance of the terminal.

The barometric pressure sensor 280C is configured to measure barometric pressure. In some embodiments, the terminal calculates an altitude by using a barometric pressure value measured by the barometric pressure sensor 280C, to assist positioning and navigation.

The magnetic sensor 280D includes a Hall effect sensor. The terminal may detect opening and closing of a flip leather case through the magnetic sensor 280D. In some embodiments, when the terminal is a clamshell phone, the terminal may detect opening and closing of a flip cover through the magnetic sensor 280D. Further, a feature like automatic unlocking of the flip cover is set based on a detected opening or closing state of the leather case or a detected opening or closing state of the flip cover.

The acceleration sensor 280E may detect a value of an acceleration of the terminal in each direction (usually on three axes). When the terminal is still, the acceleration sensor 280E may detect a value and a direction of gravity. The acceleration sensor 280E may be further configured to identify a posture of the terminal, and applied to an application like switching between a landscape mode and a portrait mode or a pedometer. In addition, the acceleration sensor 280E may be further configured to measure an orientation of the terminal (that is, a direction vector of the orientation).

The distance sensor 280F is configured to measure distances. The terminal may measure a distance by using infrared light or laser. In some embodiments, in a photographing scenario, the terminal may use the range sensor 280F to measure distances, to implement quick focusing.

The optical proximity sensor 280G may include a light emitting diode (LED) and an optical detector, for example, a photodiode. The light emitting diode may be an infrared light emitting diode. The terminal emits infrared light to the outside by using the light emitting diode. The terminal detects infrared reflected light from a nearby object by using the photodiode. When sufficient reflected light is detected, it may be determined that there is an object near the terminal. When insufficient reflected light is detected, the terminal may determine that there is no object near the terminal. The terminal may detect, through the optical proximity sensor 280G, that the user holds the terminal close to an ear to make a call, to automatically turn off a screen for power saving. The optical proximity sensor 280G may also be used for automatic screen unlocking and locking in a leather case mode or a pocket mode.

The ambient light sensor 280L is configured to sense ambient light luminance. The terminal may adaptively adjust brightness of the display 294 based on the sensed ambient light brightness. The ambient light sensor 280L may also be configured to automatically adjust white balance during photographing. The ambient light sensor 280L may further cooperate with the optical proximity sensor 280G to detect whether the terminal is in a pocket, to prevent the terminal from an accidental touch.

The fingerprint sensor 280H is configured to collect fingerprints. The terminal may implement fingerprint unlocking, application lock access, fingerprint photographing, fingerprint-based call answering, and the like by using a collected fingerprint feature.

The temperature sensor 280J is configured to detect temperatures. In some embodiments, the terminal executes a temperature processing policy based on the temperature detected by the temperature sensor 280J. For example, when the temperature reported by the temperature sensor 280J exceeds a threshold, the terminal lowers performance of a processor located near the temperature sensor 280J, to reduce power consumption to implement thermal protection. In some other embodiments, when the temperature is lower than another threshold, the terminal heats the battery 242 to prevent the terminal from being shut down abnormally because of a low temperature. In some other embodiments, when the temperature is lower than still another threshold, the terminal boosts an output voltage of the battery 242 to avoid abnormal shutdown caused by a low temperature.

The touch sensor 280K is also referred to as a "touch panel". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of the touch event. Visual output related to the touch operation may be provided by using the display 294. In some other embodiments, the touch sensor 280K may alternatively be disposed on a surface of the terminal, which is different from the display 294 in locations.

The bone conduction sensor 280M may obtain vibration signals. In some embodiments, the bone conduction sensor 280M may obtain vibration signals of a vibration bone of a human vocal-cord part. The bone conduction sensor 280M may alternatively contact a pulse of a human body and receive blood pressure pulse signals. In some embodiments, the bone conduction sensor 280M may alternatively be disposed in the headset, to combine into a bone conduction headset. The audio module 270 may obtain a voice signal through parsing based on the vibration signal that is of the vibration bone of the vocal-cord part and that is obtained by the bone conduction sensor 280M, to implement a voice function. The application processor may parse heart rate information based on the blood pressure beating signal obtained by the bone conduction sensor 280M, to implement a heart rate detection function.

The motion sensor 280N may obtain motion data.

The button 290 includes a power button, a volume button, and the like. The button 290 may be a mechanical button, or may be a touch button. The terminal may receive a button input to generate a button signal input related to user setting and function control of the terminal.

The terminal identifies the operations in embodiments of this application by using various sensors, the button 290, and/or the camera 293 in the sensor module 280 (including a first operation, a second operation, a third operation, and the like).

The motor 291 may generate vibration prompts. The motor 291 may be configured to provide incoming call vibration prompts and touch vibration feedback. For example, touch operations performed on different applications (for example, photographing and audio playback) may correspond to different vibration feedback effects. The motor 291 may also generate different vibration feedback effects for touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, or the like.

The SIM card interface 295 is configured to connect to a SIM card. The SIM card may be inserted into or removed from the SIM card interface 295, to implement contact with or separation from the terminal. The terminal may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The terminal interacts with a network by using the SIM card, to implement functions such as calls and data communication. In some embodiments, the terminal uses an eSIM, namely, an embedded SIM card. The eSIM card may be embedded in the terminal, and cannot be separated from the terminal.

The following describes a satellite short message sending method and a satellite short message receiving method of the terminal provided in embodiments of this application by using an example in which the terminal is a mobile phone. The method may be performed by the terminal, or may be performed by a component (for example, a processor, a chip, or a chip system) of the terminal.

The message transmission method provided in embodiments of this application may be applied to the terminal described above. The message transmission method may include a message sending method and a message receiving method, which are separately described below.

Figure 3:
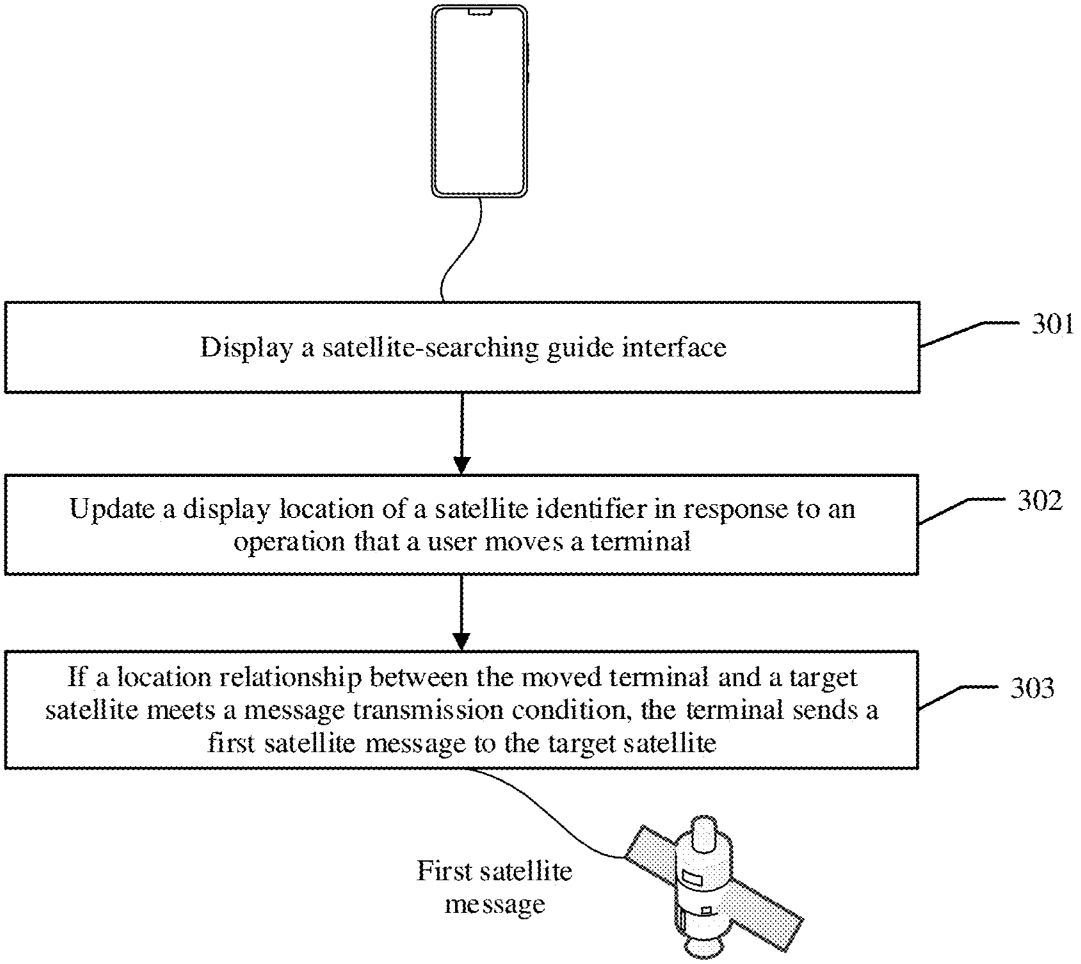
FIG. 3 is a schematic diagram of an embodiment of a message sending method according to an embodiment of this application.

As shown in FIG. 3, an embodiment of the message sending method provided in an embodiment of this application may include the following steps.

301: A terminal displays a satellite-searching guide interface.

The satellite-searching guide interface includes a satellite identifier, and a display location of the satellite identifier on the satellite-searching guide interface indicates a location relationship between the terminal and a target satellite.

In this embodiment of this application, the terminal may display a satellite message editing interface in response to an operation that the user creates a satellite message or replies to a satellite message, where the satellite message editing interface is used by the user to input content of a first satellite message. Then, the terminal may display the satellite-searching guide interface in response to an operation that the user sends the first satellite message.

In this embodiment of this application, an operation related to the satellite message (for example, the operation of creating the satellite message or replying to the satellite message) may be implemented in a satellite message function item, and the satellite message function item may be set in an information application, for example, Messaging or another communication application. Certainly, a satellite message application may alternatively be designed for the satellite message to implement a function of the satellite message function item. If the satellite message function item is set in a messaging application, the messaging application has functions of a common short message and a satellite short message. If the satellite message function item is set in an instant messaging application, the instant messaging application has an instant messaging function and a function of a satellite message. If the satellite message application is designed for the satellite message, the satellite message application has at least a function of the satellite message.

The user usually can use the function of the satellite message when a signal is poor or a mobile communication service is unavailable. In this embodiment of this application, an example in which the satellite message function item is set in Messaging is used for description, and a satellite message involved in Messaging may be referred to as a satellite short message.

Figure 4A:
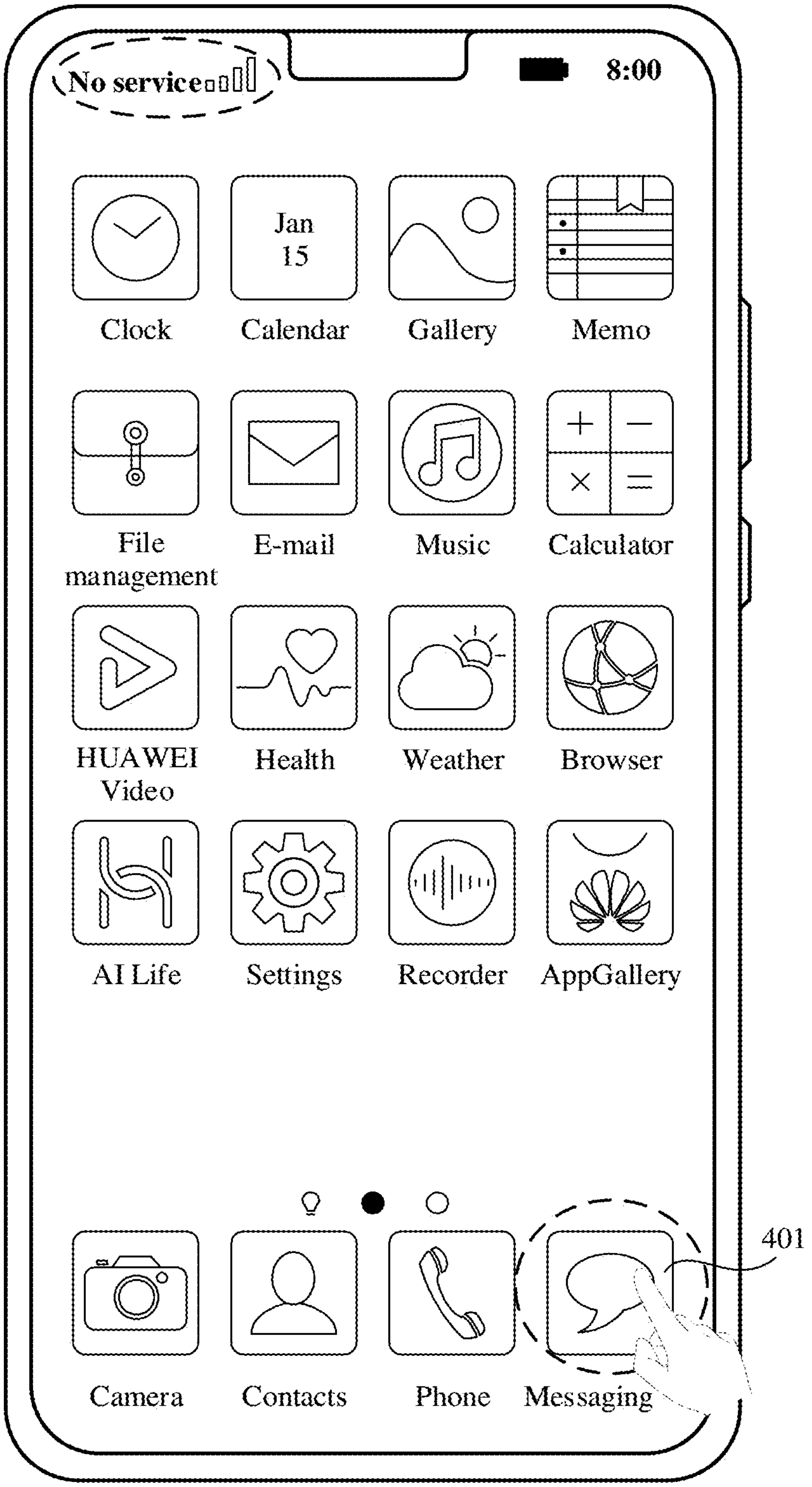
FIG. 4A is a schematic diagram of an interface according to an embodiment of this application.
Figure 4B:
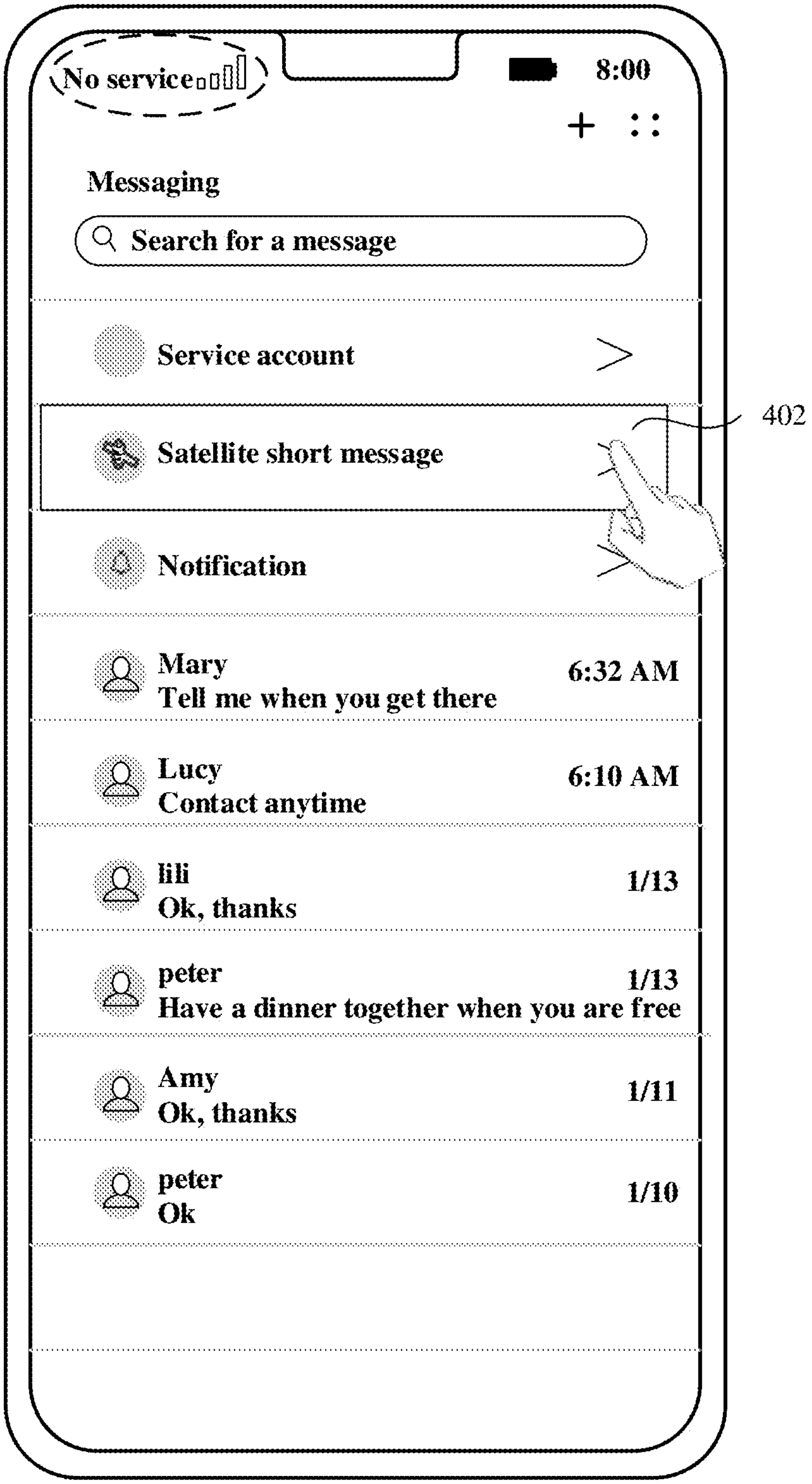
FIG. 4B is a schematic diagram of an interface of information according to an embodiment of this application.
Figure 4C:
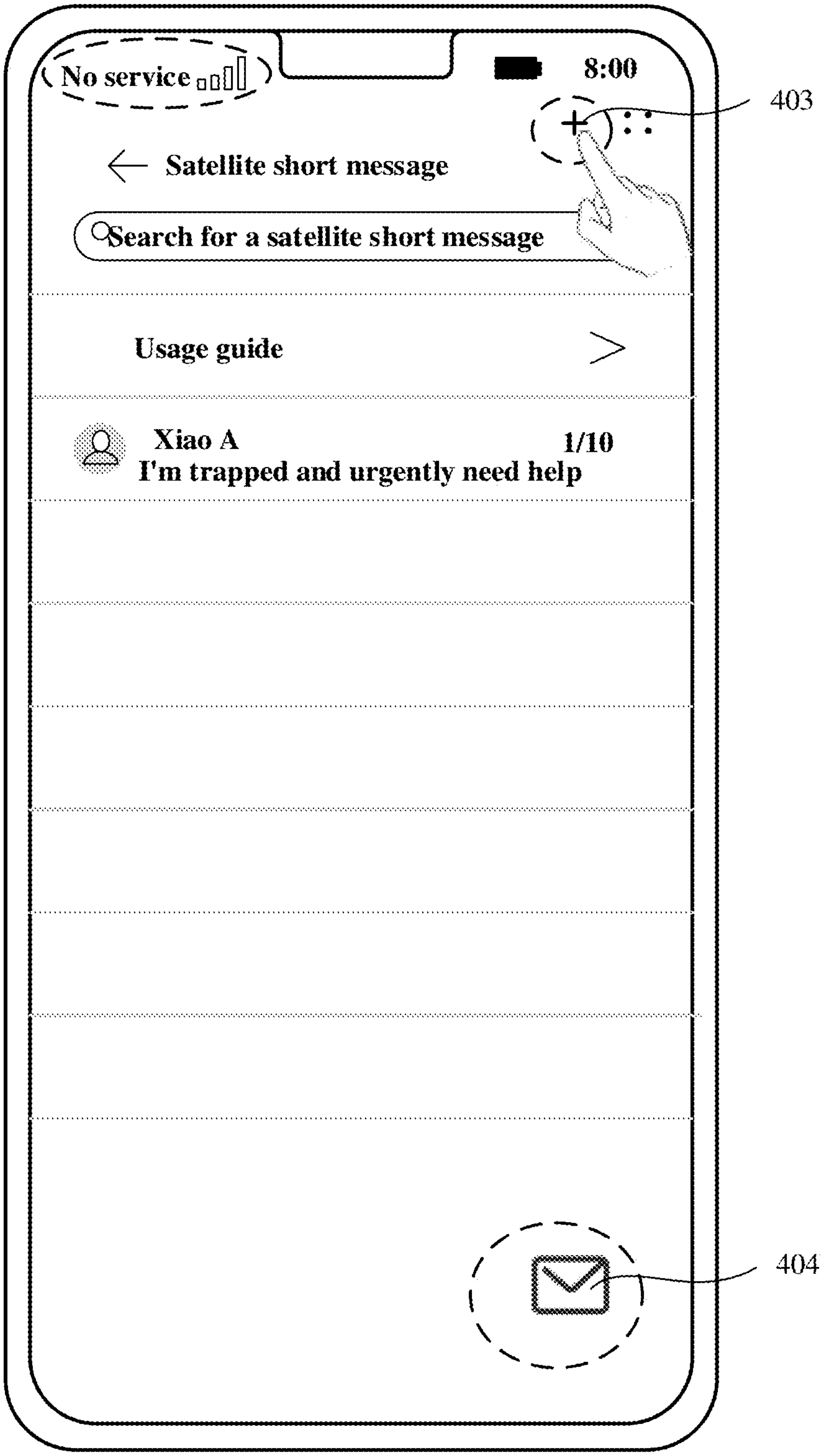
FIG. 4C is a schematic diagram of an interface of a satellite short message according to an embodiment of this application.

Messaging is used as an example. As shown in FIG. 4A, the terminal displays an information interface shown in FIG. 4B in response to a tap operation performed by the user on an information application (Messaging) 401 on a home screen of the mobile phone. The information interface includes a satellite short message function item 402. The terminal displays a satellite short message interface shown in FIG. 4C in response to a tap operation performed by the user on the satellite short message function item 402 on the information interface shown in FIG. 4B. The satellite short message interface includes an identifier 403 "Create a satellite short message", and may further include an identifier 404 "Receive a satellite short message". The user may go to an interface for creating a satellite short message through the identifier 403 "Create a satellite short message", and may go to an interface for receiving a satellite short message through the identifier 404 "Receive a satellite short message". It should be noted that the short message is used as an example for description in the scenario enumerated in this embodiment of this application. If the scenario is not a short message scenario, "Satellite short message" in FIG. 4B and FIG. 4C may be changed to "Satellite message".

Figure 4D:
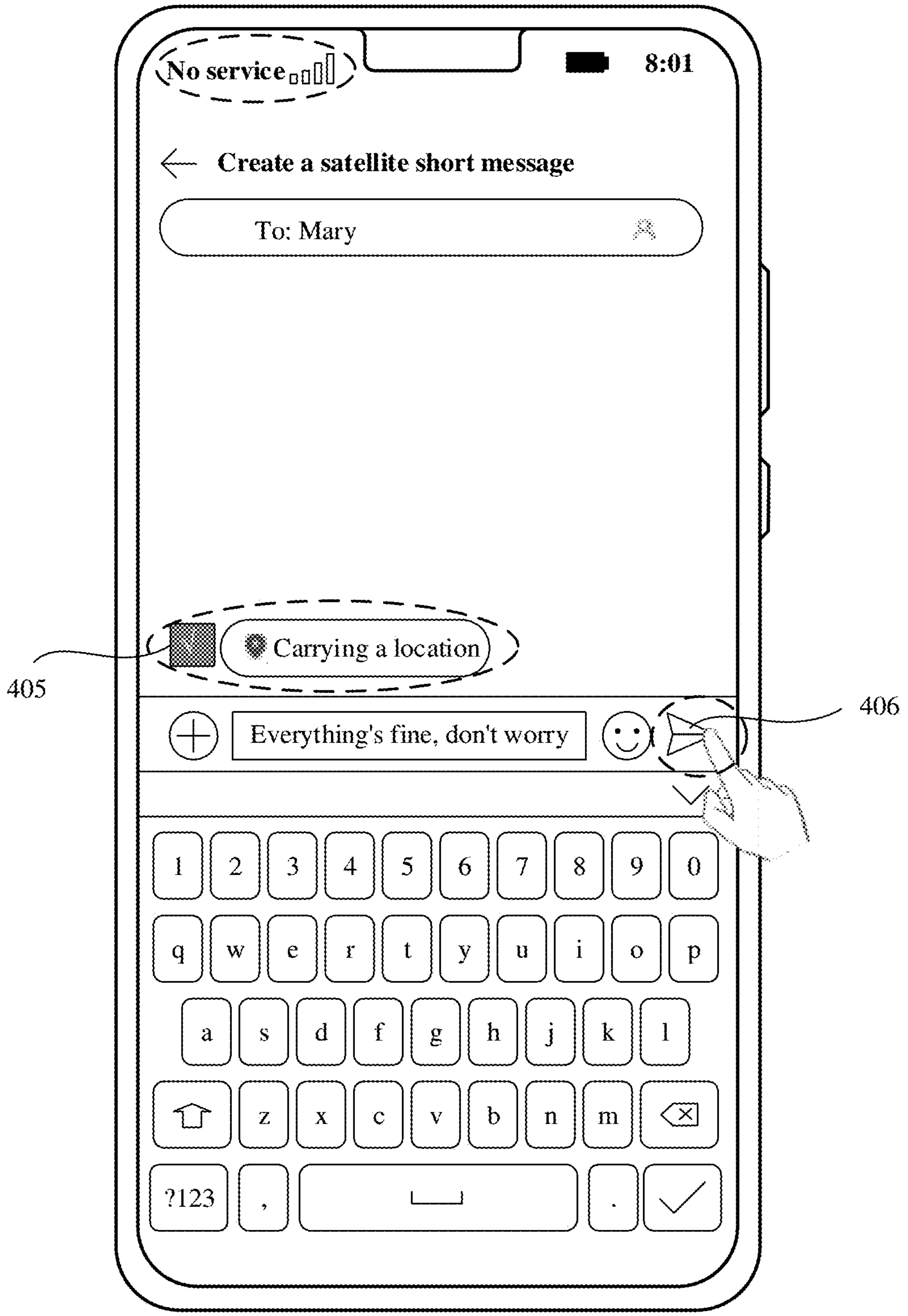
FIG. 4D is a schematic diagram of an interface for creating a satellite short message according to an embodiment of this application.

In a process of sending a satellite message (a satellite short message), the terminal displays, in response to a tap operation performed by the user on the identifier 403 "Create a satellite short message", an interface for creating a satellite short message as shown in FIG. 4D. On the interface for creating the satellite short message, the user may select a recipient from a To box, like a recipient "Mary" shown in FIG. 4D, and then edit content of the first satellite message in an editing box, such as "Everything is fine, do not worry" shown in FIG. 4D. The interface for creating the satellite short message provided in this embodiment of this application includes an identifier 405 "Carrying a location". The identifier is usually in a default selected state. When sending the content of the first satellite message to the target satellite, the terminal may automatically carry location information of a current location of the terminal. Certainly, the user can tap a "√" location to cancel a function of carrying a location. If the function of carrying a location is not selected, the location information of the current location of the terminal is not carried when the content of the first satellite message is sent.

Figure 5A:
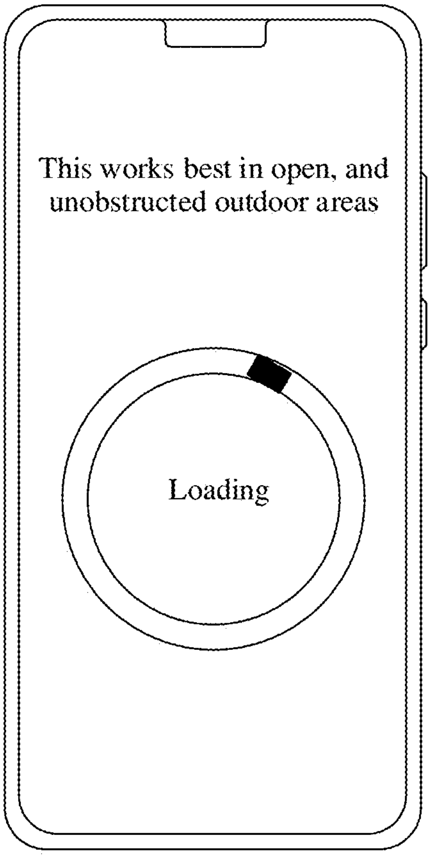
FIG. 5A is a schematic diagram of a loading interface of satellite-searching guide according to an embodiment of this application.

In this embodiment of this application, the terminal may display a loading interface shown in FIG. 5A in response to a tap operation performed by the user on a sending button 406 in FIG. 4D. The loading interface may display prompt information, for example, "This works best in open, and unobstructed outdoor areas", and may further display a loading progress.

It should be noted that, in response to the tap operation performed by the user on the sending button 406, the terminal may not display the loading interface shown in FIG. 5A, and may directly display a loaded result interface. All loaded result interfaces may be referred to as a satellite-searching guide interface.

302: The terminal updates the display location of the satellite identifier in response to an operation that the user moves the terminal.

In this embodiment of this application, the satellite-searching guide interface is used to guide the user to adjust a location of the terminal. The user may determine the location relationship between the terminal and the target satellite based on the display location of the satellite identifier on the satellite-searching guide interface, to move the terminal (for example, move the terminal leftward or rightward, or move the terminal upward or downward), and the terminal may adjust the display location of the satellite identifier on the satellite-searching guide interface in response to the movement.

303: If a location relationship between the moved terminal and the target satellite meets a message transmission condition, the terminal sends the first satellite message to the target satellite.

In this embodiment of this application, that the location relationship between the moved terminal and the target satellite meets the message transmission condition may be that the location relationship between the moved terminal and the target satellite enables the terminal to establish a communication connection to the target satellite.

In this embodiment of this application, the terminal may guide, by using the satellite-searching guide interface, the user to adjust the location relationship between the terminal and the target satellite, so that the terminal can quickly establish the communication connection to the satellite. In this way, the terminal can quickly send a satellite message.

In this embodiment of this application, the satellite-searching guide interface may further include satellite-searching prompt information, and the satellite-searching prompt information is used to prompt the user of a direction of moving the terminal. For example, the satellite-searching prompt information is moving the terminal leftward, moving the terminal rightward, moving the terminal upward, or moving the terminal downward. It should be noted that the satellite-searching prompt information is usually a prompt given by the terminal based on a shortest moving path. In this way, when the user moves the terminal based on the satellite-searching prompt information, the terminal can be quickly moved to a location suitable for establishing the communication connection to the target satellite. This increases a speed at which the terminal sends a satellite message to the target satellite or receives a satellite message from the target satellite.

Figure 5B:
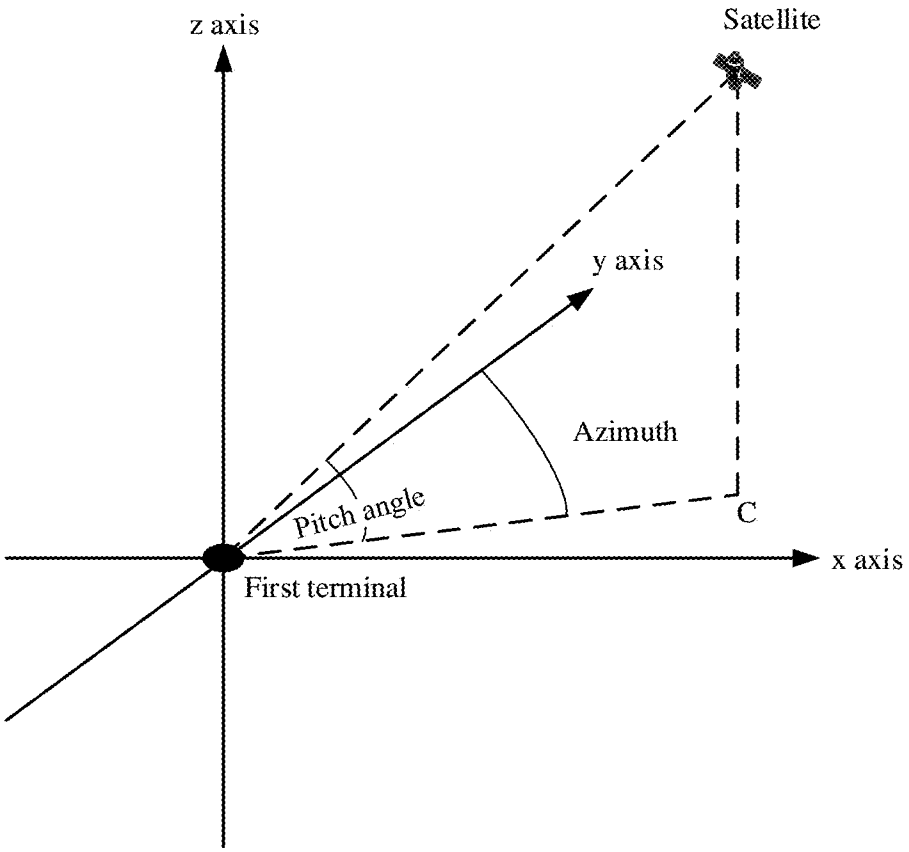
FIG. 5B is a schematic diagram of a three-dimensional coordinate system according to an embodiment of this application.

In this embodiment of this application, the satellite-searching guide interface and the interface for sending a satellite message may have a plurality of forms. The forms are related to a sequence of adjusting an azimuth and a pitch angle of the terminal and the target satellite. The azimuth and the pitch angle may be understood by referring to a three-dimensional coordinate system (xyz) shown in FIG. 5B. As shown in FIG. 5B, the terminal is located at a center of a circle of the three-dimensional coordinate system, and an antenna that is on the terminal and that communicates with a satellite is in a y-axis direction. In this case, the azimuth is an included angle between a y axis and a connection line between a projection point C of the satellite on a xy plane and the center of the circle, and the pitch angle is an included angle between the connection line between the projection point C of the satellite on the xy plane and the center of the circle, and the connection line between the satellite and the center of the circle.

In this embodiment of this application, the satellite-searching guide interface may include a first satellite-searching guide interface and a second satellite-searching guide interface. The first satellite-searching guide interface includes a first satellite identifier and a first alignment area, the first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite-searching guide interface includes a second satellite identifier and a second alignment area, the second satellite identifier indicates a location relationship between the terminal and the target satellite in a pitch angle, and when the location relationship between the terminal and the target satellite in the pitch angle meets the message transmission condition, the second satellite identifier is located in the second alignment area.

In this embodiment of this application, the satellite-searching guide interface may be not divided into the first satellite-searching guide interface and the second satellite-searching guide interface, but includes a first satellite identifier, a first alignment area, a second satellite identifier, and a second alignment area. The first satellite identifier indicates the location relationship between the terminal and the target satellite in the azimuth, and when the location relationship between the terminal and the target satellite in the azimuth meets the message transmission condition, the first satellite identifier is located in the first alignment area. The second satellite identifier indicates the location relationship between the terminal and the target satellite in the pitch angle, and when the location relationship between the terminal and the target satellite in the pitch angle meets the message transmission condition, the second satellite identifier is located in the second alignment area.

In this embodiment of this application, a representation form of the satellite-searching guide interface is related to a sequence of adjusting the azimuth and the pitch angle of the terminal and the target satellite. The following describes satellite-searching guide interfaces in different representation forms based on the sequence of adjusting the azimuth and the pitch angle of the terminal and the target satellite.

Solution 1: A satellite-searching guide interface (the first satellite-searching guide interface) for adjusting an azimuth.

Figure 5C:
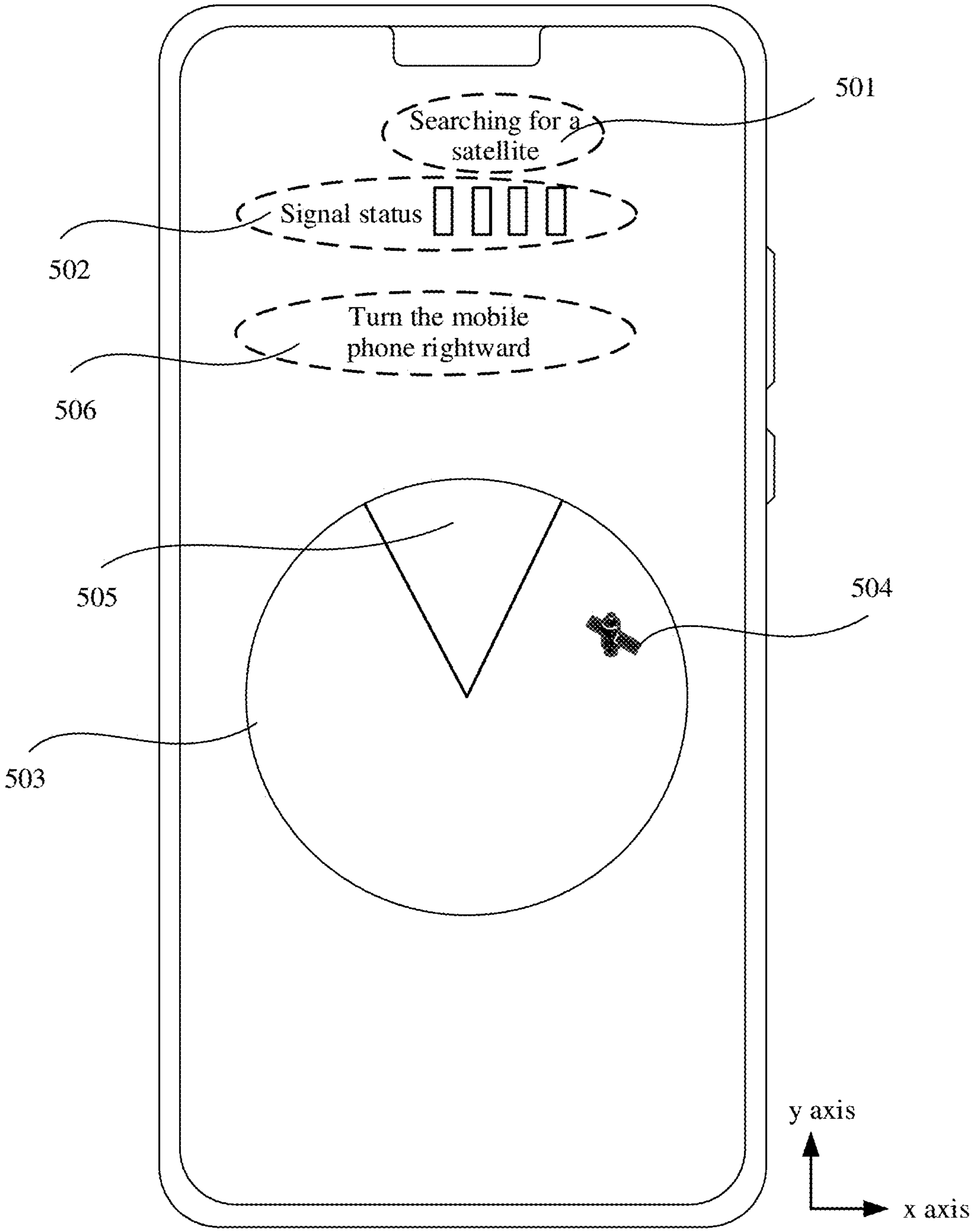
FIG. 5C to FIG. 5F are a schematic diagram of a plurality of satellite-searching guide interfaces according to an embodiment of this application.

In this embodiment of this application, refer to FIG. 5C for understanding the satellite-searching guide interface during azimuth adjustment. As shown in FIG. 5C, the satellite-searching guide interface displays information 501 "Searching for a satellite" and further displays an identifier 502 "Signal status". Currently, in FIG. 5C, all four signal bars are blank, indicating that there is no signal. In FIG. 5C, an area used to adjust the location relationship between the terminal and the target satellite is represented by a disk area 503, a first satellite identifier 504 is displayed in the disk area 503, and an area covered by an antenna communicating with the target satellite is represented by a sector, and is generally in a range of plus or minus 15 degrees of a centerline of the disk area 503, where the centerline is a line that passes through a center of a circle of the disk 503 and is parallel to the y axis, and the sector-shaped area may be referred to as a first alignment area 505. The satellite-searching guide interface may further display satellite-searching prompt information, for example, a word 506 "Turn the mobile phone rightward" in FIG. 5C, which is a type of satellite-searching prompt information for adjusting the azimuth.

It should be noted that in this embodiment of this application, a location of the first satellite identifier 504 and a location of the first alignment area 505 in the disk area 505 are determined by using a location of an antenna that is in the terminal and that communicates with the target satellite as a reference, a horizontal direction of the target satellite relative to the terminal is determined, and the first satellite identifier 504 is displayed in a corresponding location of the disk area 503. The location of the first satellite identifier 504 may be determined by performing reverse calculation in a manner in which the target satellite performs mobile phone positioning.

It should be noted that specific content of the satellite-searching prompt information displayed on the satellite-searching guide interface is related to the location of the first satellite identifier 504. As shown in FIG. 5C, if the first satellite identifier 504 is located on a right side of the first alignment area 505, that is, in a range of 0° to 180° from a right side of the centerline of the first alignment area 505, the terminal usually gives the satellite-searching prompt information "Turn the mobile phone rightward", so that the first satellite identifier 504 can enter the first alignment area 505 with a shorter path or a smaller turning angle. If the first satellite identifier 504 is located on a left side of the first alignment area 505, that is, in a range of 0° to 180° from a left side of the centerline of the first alignment area 505, the terminal usually gives satellite-searching prompt information "Turn the mobile phone leftward", so that the first satellite identifier 504 enters the first alignment area 505 with a shorter path or a smaller turning angle. Although a schematic diagram in which the first satellite identifier 504 is located on the left side of the first alignment area 505 is not provided in this embodiment of this application, a solution in which the first satellite identifier 504 is located on the left side of the first alignment area 505 can be easily understood with reference to FIG. 5C based on the text description herein.

Figure 5D:
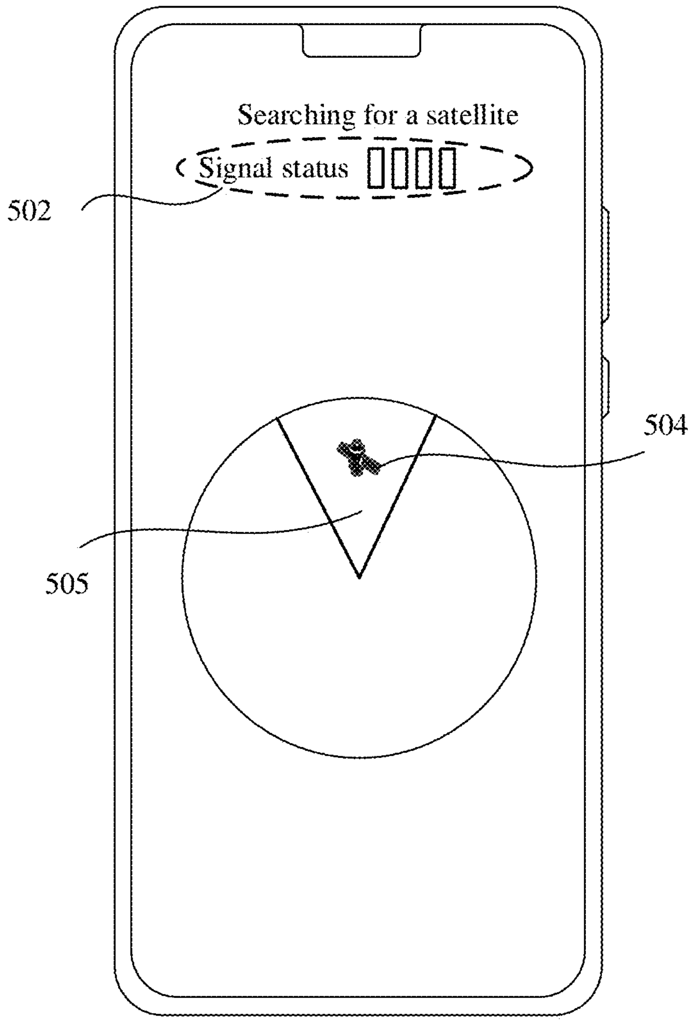

On the satellite-searching guide interface shown in FIG. 5C, if the user performs an operation based on the satellite-searching prompt information "Turn the mobile phone rightward", or the user turns the mobile phone leftward by a difference between 360 degrees and a degree of turning the mobile phone rightward, the first satellite identifier 504 may be turned to the first alignment area 505, and an interface of the terminal is refreshed accordingly, to display a satellite-searching guide interface shown in FIG. 5D. On the satellite-searching guide interface shown in FIG. 5D, the first satellite identifier 504 is located at the centerline of the first alignment area 505, indicating that the azimuth has been adjusted. Because the pitch angle has not been adjusted, four signal bars of the identifier 502 "Signal status" on the satellite-searching guide interface shown in FIG. 5D are still blank.

It should be noted that, in this embodiment of this application, when a display location of the first satellite identifier is outside the first alignment area, the first alignment area is displayed in a first color; and when a display location of the first satellite identifier is in the first alignment area, the first alignment area is displayed in a second color, and the first color is different from the second color.

Figure 5E:
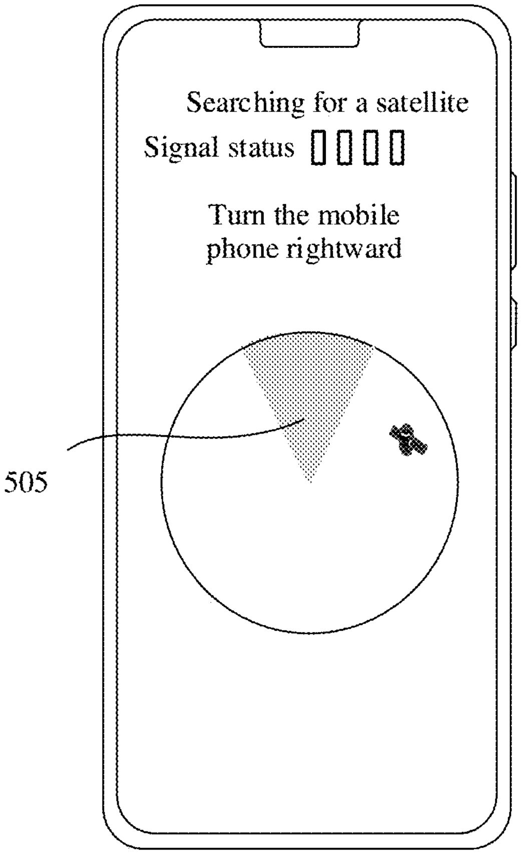
Figure 5F:
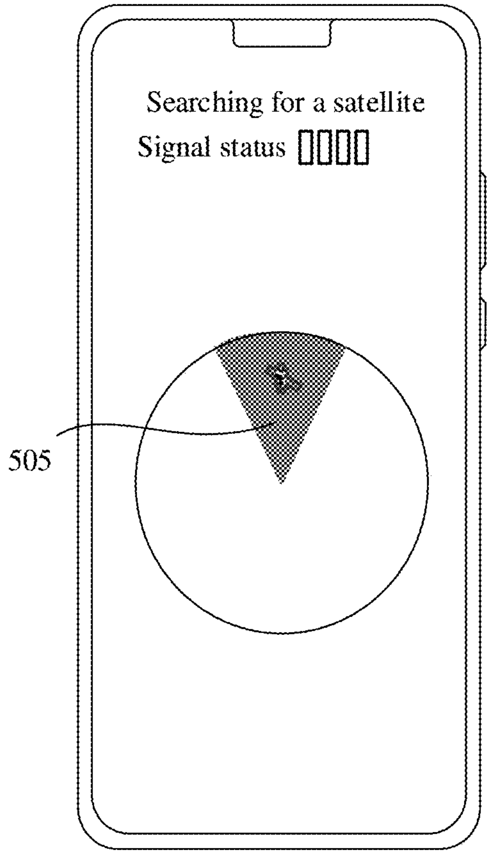

With reference to the foregoing satellite short message scenario, compared with that shown in FIG. 5C, as shown in FIG. 5E, the first alignment area 505 may be displayed in the first color before the azimuth is adjusted. Compared with that shown in FIG. 5D, as shown in FIG. 5F, the first alignment area 505 may be displayed in the second color after the azimuth is adjusted and the first satellite identifier 504 is located in the first alignment area 505. The first color is different from the second color. In this way, the user may be better prompted by using a color change that azimuth alignment has been completed.

Solution 2: A satellite-searching guide interface (the second satellite-searching guide interface) for adjusting a pitch angle.

Figure 6A:
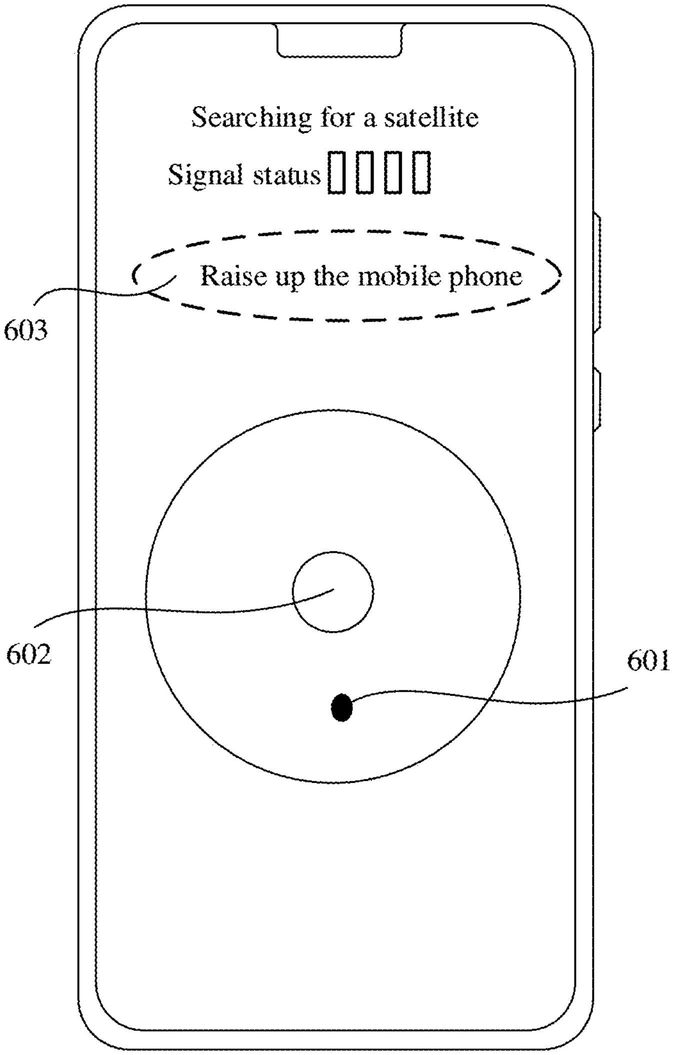
FIG. 6A to FIG. 6D are a schematic diagram of a plurality of satellite-searching guide interfaces according to an embodiment of this application.

In this embodiment of this application, refer to FIG. 6A for understanding the satellite-searching guide interface during pitch angle adjustment. As shown in FIG. 6A, the satellite-searching guide interface displays information "Searching for a satellite" and an identifier "Signal status". Currently, in FIG. 6A, all four signal bars are blank, indicating that there is no signal. In FIG. 6A, an area used to adjust the location relationship between the terminal and the target satellite is represented by a disk area. Content in FIG. 6A may be understood with reference to descriptions of 501, 502, and 503 in FIG. 5C.

A second satellite identifier 601 may be displayed in the disk area, and a second alignment area 602 is a small disk communicating with the disk area. The satellite-searching guide interface may further display satellite-searching prompt information, for example, a word 603 "Raise up a mobile phone" in FIG. 6A, which is a type of satellite-searching prompt information for adjusting a pitch angle.

It should be noted that in this embodiment of this application, a location of the second satellite identifier 601 and a location of the second alignment area 602 in the disk area are determined by using a location of an antenna that is in the terminal and that communicates with the target satellite as a reference, a pitch direction of the target satellite relative to the terminal is determined, and the second satellite identifier 601 is displayed in a corresponding location of the disk area.

It should be noted that specific content of the satellite-searching prompt information displayed on the satellite-searching guide interface is related to the location of the second satellite identifier 601. As shown in FIG. 6A, when the second satellite identifier 601 is located directly below the second alignment area 602, the terminal gives satellite-searching prompt information "Raise up a mobile phone". When the second satellite identifier 601 is located directly above the second alignment area 602, the terminal gives satellite-searching prompt information "Press down a mobile phone". Although a schematic diagram in which the second satellite identifier 601 is located above the second alignment area 602 is not provided in this embodiment of this application, a solution in which the second satellite identifier 601 is located above the second alignment area 602 can be easily understood with reference to FIG. 6A based on the text description herein.

Figure 6B:
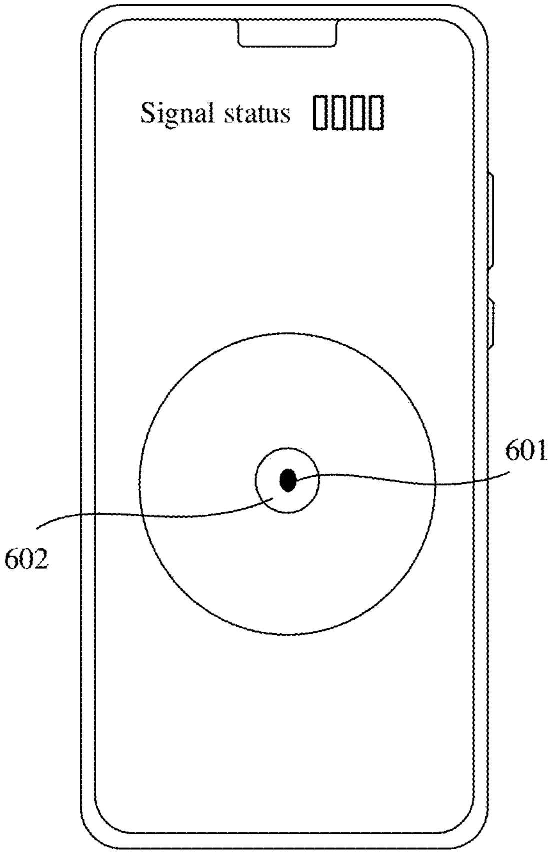

On the satellite-searching guide interface shown in FIG. 6A, if the user performs an operation based on the satellite-searching prompt information "Raise up a mobile phone" to move the second satellite identifier 601 to the second alignment area 602, the interface of the terminal is refreshed accordingly to display a satellite-searching guide interface shown in FIG. 6B. On the satellite-searching guide interface shown in FIG. 6B, the second satellite identifier 601 is located at a central location of the second alignment area 602, indicating that the pitch angle has been adjusted.

It should be noted that, when a display location of the second satellite identifier is outside the second alignment area, the second alignment area is displayed in a third color; and when a display location of the second satellite identifier is in the second alignment area, the second alignment area is displayed in a fourth color, and the third color is different from the fourth color.

With reference to the foregoing satellite short message scenario, compared with that shown in FIG. 6A, the second alignment area 602 may be displayed in the third color when the azimuth is not adjusted. After the azimuth is adjusted, and the second satellite identifier 601 is located in the second alignment area 602, the second alignment area 602 may also be displayed in the fourth color, and the third color is different from the fourth color. Although a color change process of the second alignment area 602 is not shown in a schematic diagram, the color change process of the second alignment area 602 may be understood with reference to the color change processes of FIG. 5E and FIG. 5F. In this way, the user may be better prompted by using the color change that pitch angle alignment has been completed.

Solution 3: A satellite-searching guide interface for adjusting an azimuth first and then adjusting a pitch angle.

In Solution 3, the first satellite-searching guide interface is first displayed, and then the second satellite-searching guide interface is displayed. Corresponding to the foregoing steps 301 and 302, the process may specifically include: displaying the first satellite-searching guide interface; in response to an operation that the user moves the terminal leftward or rightward, updating a display location of the first satellite identifier; when the first satellite identifier is located in the first alignment area, displaying the second satellite-searching guide interface; and in response to an operation that the user moves the terminal upward or downward, updating a display location of the second satellite identifier.

Figure 6C:
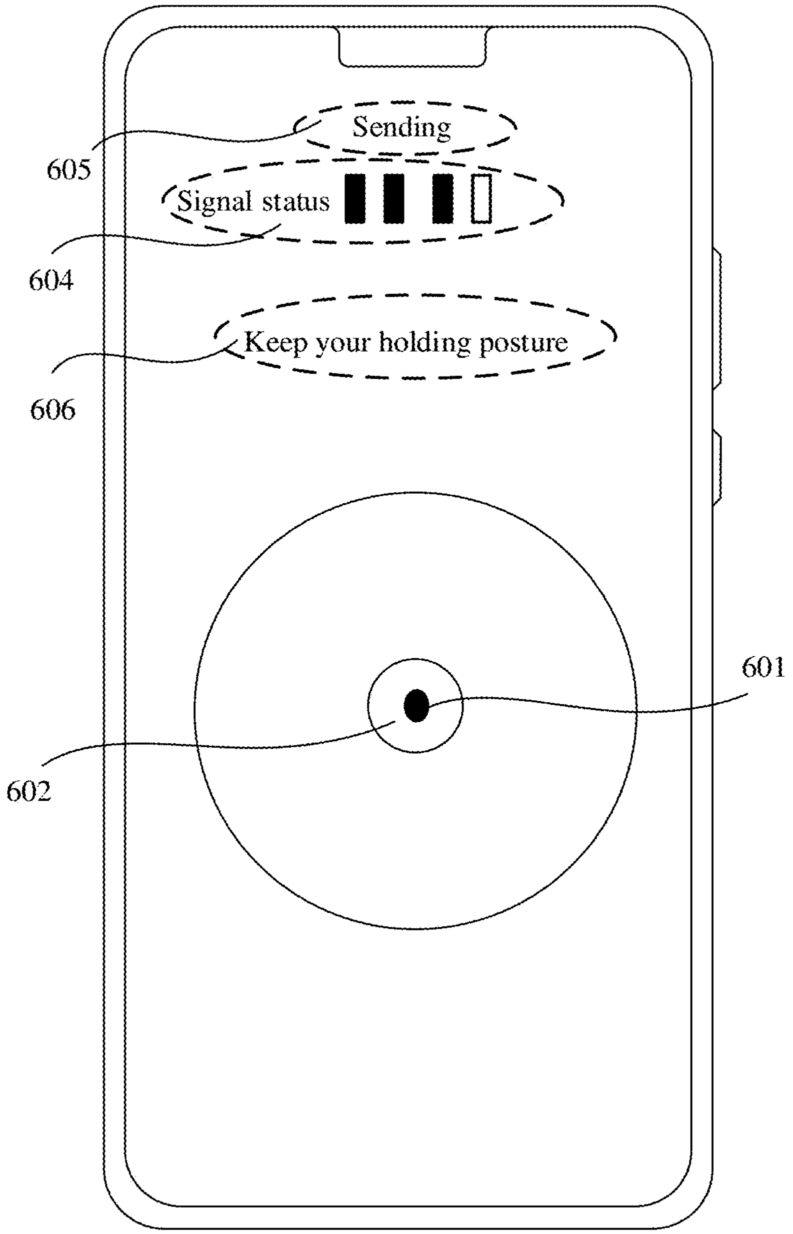

With reference to the satellite short message scenarios described in the foregoing Solution 1 and Solution 2, in this embodiment of this application, if satellite-searching adjustment is performed in a sequence of adjusting the azimuth first and then adjusting the pitch angle, the terminal successively displays FIG. 5C, FIG. 5D, FIG. 6A, and FIG. 6B. Then, an interface for sending a satellite message shown in FIG. 6C may be obtained. As shown in FIG. 6C, based on the sequence of adjusting the azimuth first and then adjusting the pitch angle, only the second satellite identifier 601 and the second alignment area 602 of the interface for adjusting the pitch angle may be displayed on the interface for sending a satellite short message, and the first satellite identifier 504 and the first alignment area 505 are not displayed. In addition, three of four signal bars in an identifier 604 "Signal status" on the interface for sending a satellite short message are full, indicating that a connection to a satellite is established. The interface for sending a satellite short message may further display a word 605 "Sending", and may also display a word 606 "Keep your holding posture".

Solution 4: A satellite-searching guide interface for adjusting a pitch angle first and then adjusting an azimuth.

In Solution 4, the second satellite-searching guide interface is first displayed, and then the first satellite-searching guide interface is displayed. Corresponding to the foregoing steps 301 and 302, the process may specifically include: displaying the second satellite-searching guide interface; in response to an operation that the user moves the terminal upward or downward, updating a display location of the second satellite identifier; when the second satellite identifier is located in the second alignment area, displaying the first satellite-searching guide interface; and in response to an operation that the user moves the terminal leftward or rightward, updating a display location of the first satellite identifier.

Figure 6D:
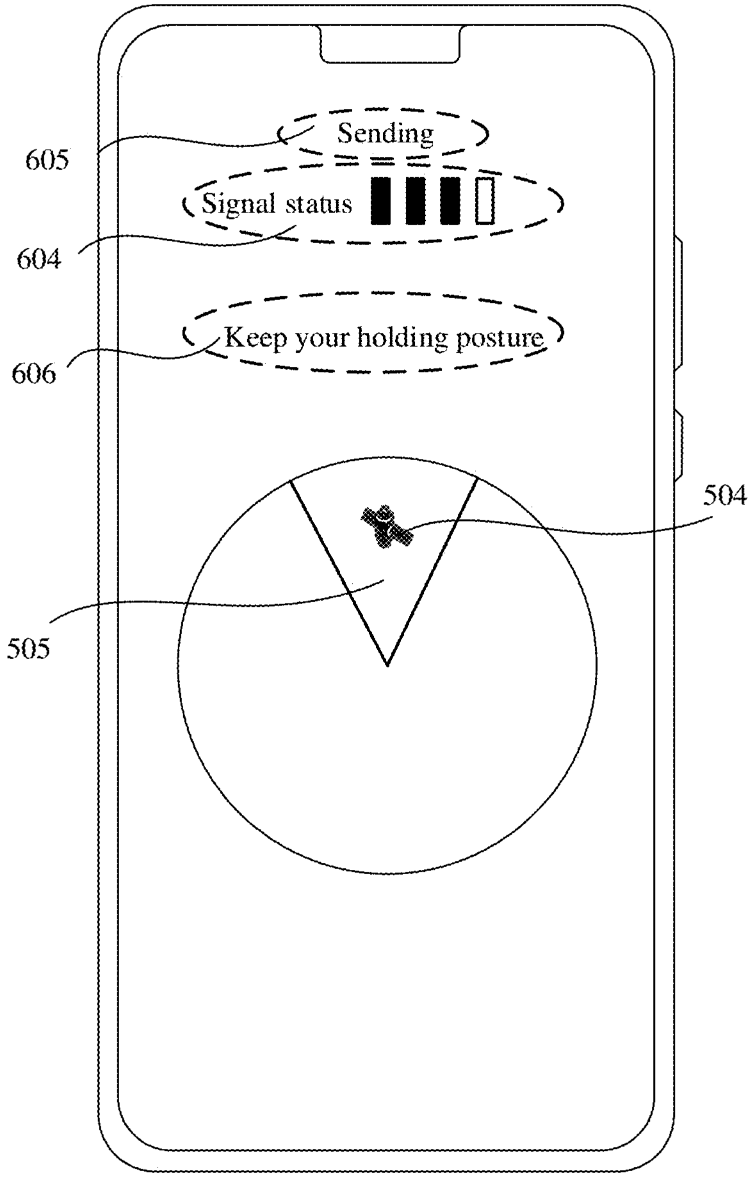

With reference to the satellite short message scenarios described in the foregoing Solution 1 and Solution 2, in this embodiment of this application, if satellite-searching adjustment is performed in a sequence of adjusting the pitch angle first and then adjusting the azimuth, the terminal successively displays FIG. 6A, FIG. 6B, FIG. 5C, and FIG. 5D. Then, an interface for sending a satellite short message shown in FIG. 6D may be obtained. As shown in FIG. 6D, based on the sequence of adjusting the pitch angle first and then adjusting the azimuth, only the first satellite identifier 504 and the first alignment area 505 of the interface for adjusting the azimuth may be displayed on the interface for sending a satellite short message, and the second satellite identifier 601 and the second alignment area 602 are not displayed. In addition, three of four signal bars in an identifier 604 "Signal status" on the interface for sending a satellite short message are full, indicating that a connection to a satellite is established. The interface for sending a satellite short message may further display a word 605 "Sending", and may also display a word 606 "Keep your holding posture".

Solution 5: Another satellite-searching guide interface for adjusting an azimuth first and then adjusting a pitch angle.

In Solution 5, the first satellite-searching guide interface is first displayed, and then the second satellite-searching guide interface is displayed. A difference from Solution 3 in which the first satellite identifier and the first alignment area are not displayed on the second satellite-searching guide interface lies in that: The first satellite identifier and the first alignment area are displayed on the second satellite-searching guide interface in Solution 5.

Figure 7A:
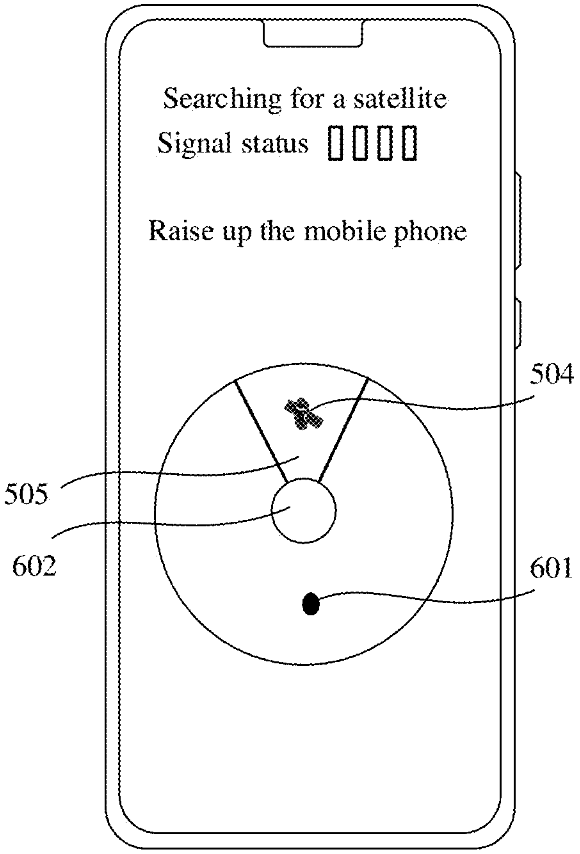
FIG. 7A to FIG. 7C are a schematic diagram of a plurality of satellite-searching guide interfaces according to an embodiment of this application.

With reference to the foregoing satellite short message scenario, in this embodiment of this application, if satellite-searching adjustment is performed in a sequence of adjusting the azimuth first and then adjusting the pitch angle, the terminal successively displays FIG. 5C and FIG. 5D, and then displays a satellite-searching guide interface shown in FIG. 7A.

As shown in FIG. 7A, when the pitch angle is adjusted, not only the second satellite identifier 601 and the second alignment area 602 but also the first satellite identifier 504 and the first alignment area 505 are displayed on the satellite-searching guide interface. In addition, the satellite-searching guide interface shown in FIG. 7A may further display satellite-searching prompt information "Raise up a mobile phone", "Signal status", and words such as "Searching for a satellite". These have been described in FIG. 6A above, and are not described herein again.

Figure 7B:
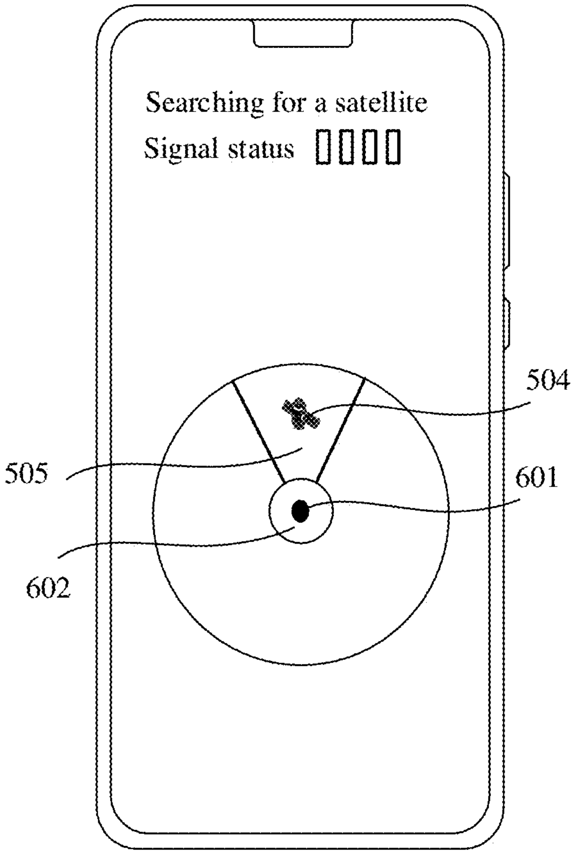

On the satellite-searching guide interface shown in FIG. 7A, if the user performs an operation based on the satellite-searching prompt information "Raise up a mobile phone" to move the second satellite identifier 601 to the second alignment area 602, the interface of the terminal is refreshed accordingly, to display a satellite-searching guide interface shown in FIG. 7B. On the satellite-searching guide interface shown in FIG. 7B, the second satellite identifier 601 is located at a central location of the second alignment area 602, indicating that the pitch angle has been adjusted, and the first satellite identifier 504 is further displayed in the first alignment area 505.

It should be noted that, if the first satellite identifier 504 deviates from the first alignment area 505 in a process of adjusting the pitch angle, the first satellite identifier 504 may be adjusted back to the first alignment area 505 again by using the foregoing azimuth adjustment principle.

Figure 7C:
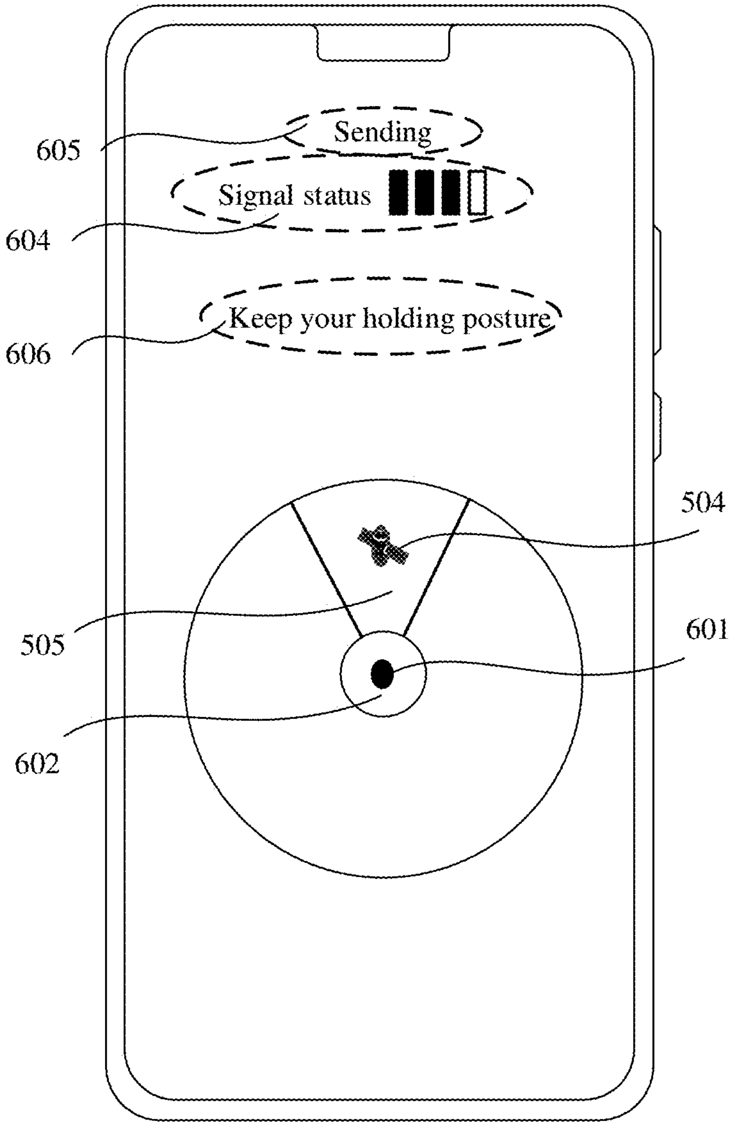

On the basis of FIG. 7B, the terminal refreshes an interface for sending a satellite short message shown in FIG. 7C. As shown in FIG. 7C, based on the sequence of adjusting the azimuth first and then adjusting the pitch angle, not only the second satellite identifier 601 and the second alignment area 602 of the interface for adjusting the pitch angle but also the first satellite identifier 504 and the first alignment area 505 may be displayed on the interface for sending a satellite short message. In addition, three of four signal bars in the identifier 604 "Signal status" on the interface for sending a satellite short message are full, indicating that a connection to a satellite is established. The interface for sending a satellite short message may further display a word 605 "Sending", and may also display a word 606 "Keep your holding posture".

Solution 6: Another satellite-searching guide interface for adjusting pitch angle first and then adjusting an azimuth.

In Solution 6, the second satellite-searching guide interface is first displayed, and then the first satellite-searching guide interface is displayed. A difference from Solution 4 in which the second satellite identifier and the second alignment area are not displayed on the first satellite-searching guide interface lies in that: The second satellite identifier and the second alignment area are further displayed on the first satellite-searching guide interface in Solution 6.

Figure 8A:
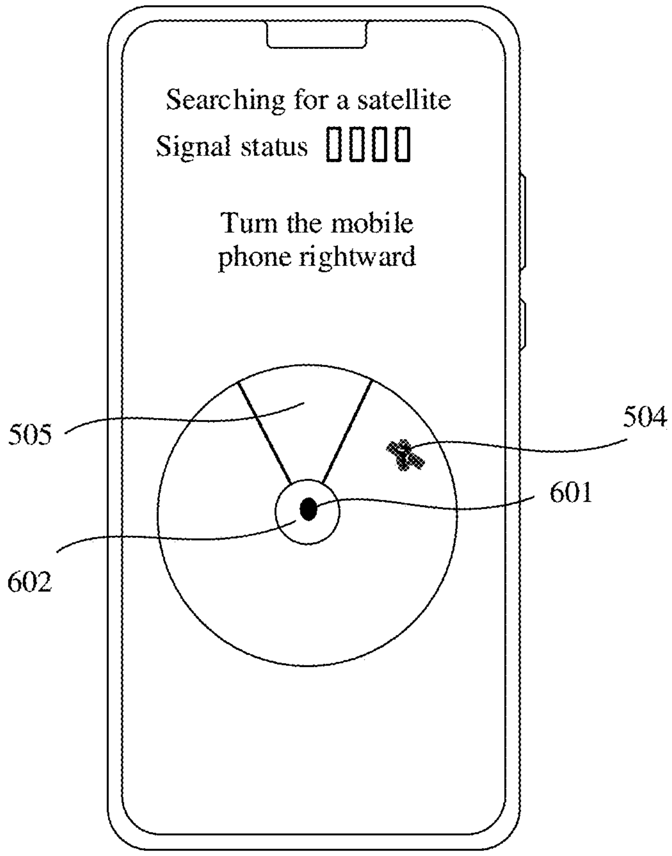
FIG. 8A to FIG. 8C are a schematic diagram of a plurality of satellite-searching guide interfaces according to an embodiment of this application.

With reference to the foregoing satellite short message scenario, in this embodiment of this application, if satellite-searching adjustment is performed in a sequence of adjusting the pitch angle first and then adjusting the azimuth, the terminal successively displays FIG. 6A and FIG. 6B, and then displays a satellite-searching guide interface shown in FIG. 8A.

As shown in FIG. 8A, when the pitch angle is adjusted, not only the first satellite identifier 504 and the first alignment area 505 but also the second satellite identifier 601 and the second alignment area 602 are displayed on the satellite-searching guide interface. In addition, the satellite-searching guide interface shown in FIG. 8A may further display satellite-searching prompt information "Turn the mobile phone rightward", "Signal status", and words such as "Searching for a satellite". These have been described in FIG. 5C above, and are not described herein again.

On the satellite-searching guide interface shown in FIG. 8A, if the user performs an operation based on the satellite-searching prompt information "Turn the mobile phone rightward" to turn the first satellite identifier 504 to the first alignment area 505, the interface of the terminal is refreshed accordingly, to display a satellite-searching guide interface shown in FIG. 7B. On the satellite-searching guide interface shown in FIG. 7B, the first satellite identifier 504 is located in the first alignment area 505, indicating that the azimuth has been adjusted, and the second satellite identifier 601 is further displayed in the second alignment area 602.

It should be noted that, if the second satellite identifier 601 deviates from the second alignment area 602 in a process of adjusting the azimuth, the second satellite identifier 601 may be adjusted back to the second alignment area 602 again by using the foregoing pitch angle adjustment principle.

On the basis of FIG. 7B, the terminal refreshes an interface for sending a satellite short message shown in FIG. 7C. As shown in FIG. 7C, based on the sequence of adjusting the pitch angle first and then adjusting the azimuth, not only the first satellite identifier 504 and the first alignment area 505 of the interface for adjusting the azimuth but also the second satellite identifier 601 and the second alignment area 602 may be displayed on the interface for sending a satellite short message. In addition, three of four signal bars in the identifier 604 "Signal status" on the interface for sending a satellite short message are full, indicating that a connection to a satellite is established. The interface for sending a satellite short message may further display a word 605 "Sending", and may also display a word 606 "Keep your holding posture".

Solution 7: Another satellite-searching guide interface for adjusting an azimuth first and then adjusting a pitch angle.

The satellite-searching guide interface in Solution 7 includes the first satellite identifier, the first alignment area, the second satellite identifier, and the second alignment area. Step 302 in the foregoing embodiment specifically includes: updating a display location of the first satellite identifier in response to an operation that the user moves the terminal leftward or rightward; and updating a display location of the second satellite identifier in response to an operation that the user moves the terminal upward or downward.

Figure 8B:
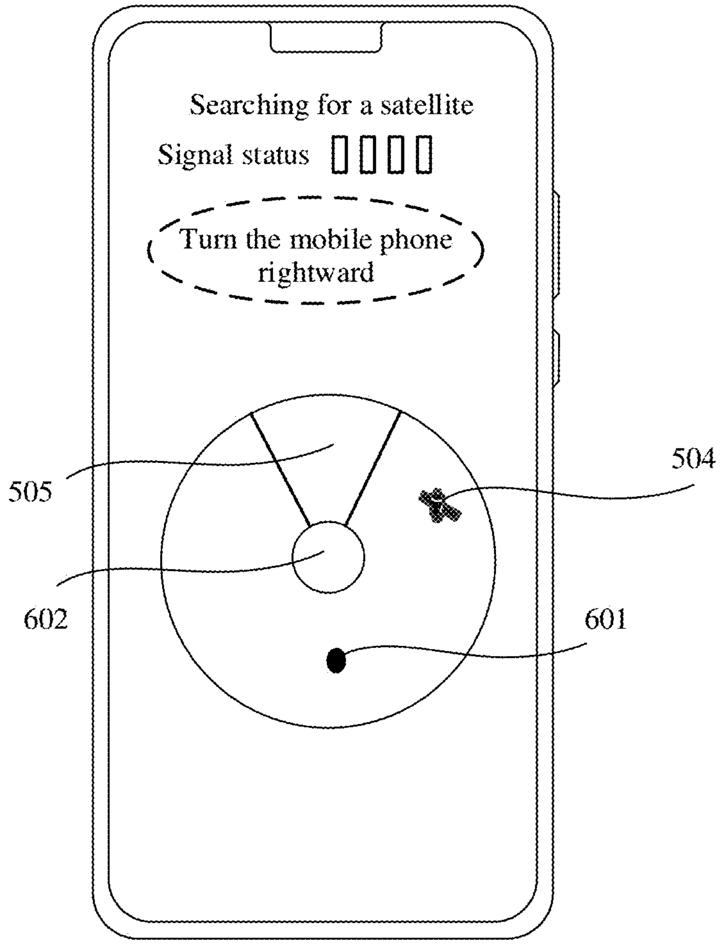

With reference to the foregoing satellite short message scenario, in this embodiment of this application, if satellite-searching adjustment is performed in a sequence of adjusting the azimuth first and then adjusting the pitch angle, the terminal may display a satellite-searching guide interface shown in FIG. 8B based on the sequence.

As shown in FIG. 8B, when the azimuth is adjusted, not only the first satellite identifier 504 and the first alignment area 505 but also the second satellite identifier 601 and the second alignment area 602 are displayed on the satellite-searching guide interface. In addition, the satellite-searching guide interface shown in FIG. 8B may further display satellite-searching prompt information "Turn the mobile phone rightward", "Signal status", and words such as "Searching for a satellite". These have been described in FIG. 5C above, and are not described herein again.

On the satellite-searching guide interface shown in FIG. 8B, if the user performs an operation based on the satellite-searching prompt information "Turn the mobile phone rightward" to turn the first satellite identifier 504 to the first alignment area 505, the interface of the terminal is refreshed accordingly, to display the satellite-searching guide interface shown in FIG. 7A. Then, on the basis of the satellite-searching guide interface shown in FIG. 7A, the pitch angle is adjusted to refresh the satellite-searching guide interface shown in FIG. 7B, and further refresh the interface for sending a satellite short message shown in FIG. 7C.

Solution 8: Another satellite-searching guide interface for adjusting a pitch angle first and then adjusting an azimuth.

Figure 8C:
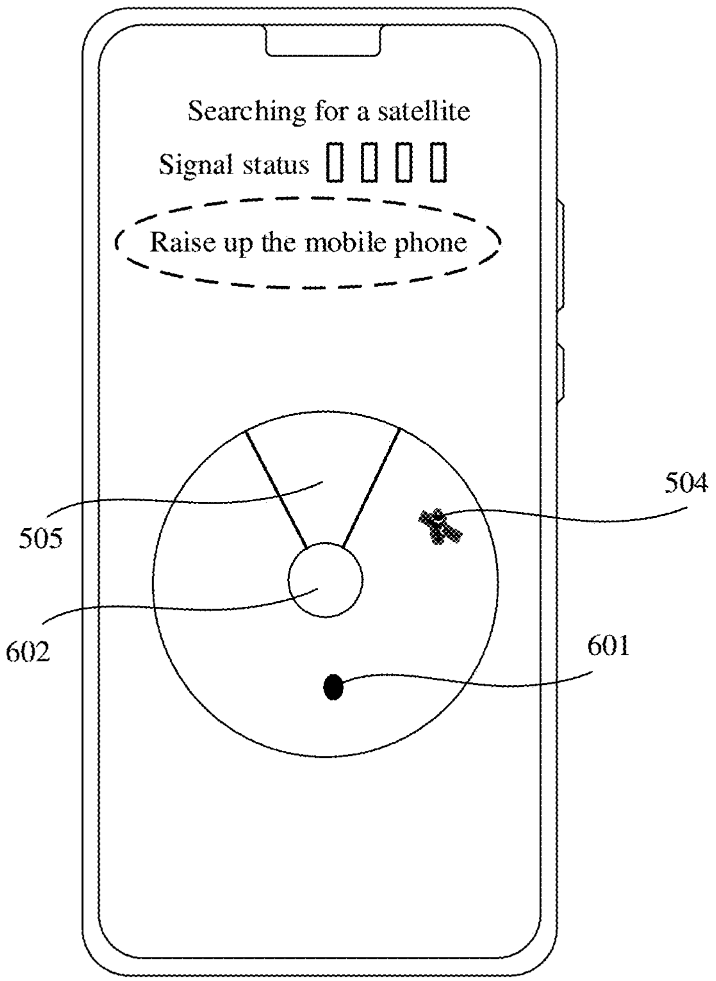

With reference to the foregoing satellite short message scenario, in this embodiment of this application, if satellite-searching adjustment is performed in a sequence of adjusting the pitch angle first and then adjusting the azimuth, the terminal may display a satellite-searching guide interface shown in FIG. 8C based on the sequence.

As shown in FIG. 8C, when the azimuth is adjusted, not only the first satellite identifier 504 and the first alignment area 505 but also the second satellite identifier 601 and the second alignment area 602 are displayed on the satellite-searching guide interface. In addition, the satellite-searching guide interface shown in FIG. 8C may further display satellite-searching prompt information "Raise up a mobile phone", "Signal status", and words such as "Searching for a satellite". These have been described in FIG. 5C above, and are not described herein again.

On the satellite-searching guide interface shown in FIG. 8C, if the user performs an operation based on the satellite-searching prompt information "Raise up a mobile phone" to move the second satellite identifier 601 to the second alignment area 602, the interface of the terminal is refreshed accordingly, to display the satellite-searching guide interface shown in FIG. 8A. Then, on the basis of the satellite-searching guide interface shown in FIG. 8A, the azimuth is adjusted to refresh the satellite-searching guide interface shown in FIG. 7B, and further refresh the interface for sending a satellite short message shown in FIG. 7C.

Solution 9: A satellite-searching guide interface for adjusting an azimuth and a pitch angle at the same time.

With reference to the foregoing satellite short message scenarios, in this embodiment of this application, not only the azimuth and the pitch angle may be adjusted in sequence based on the eight solutions described above, but also both the azimuth and the pitch angle may be adjusted. When the pitch angle and the azimuth are adjusted at the same time, the terminal may directly display a satellite-searching guide interface shown in FIG. 9. Different from the satellite-searching prompt information in FIG. 8B or FIG. 8C, satellite-searching prompt information in FIG. 9 is "Turn the mobile phone rightward and raise up the mobile phone".

Figure 9:
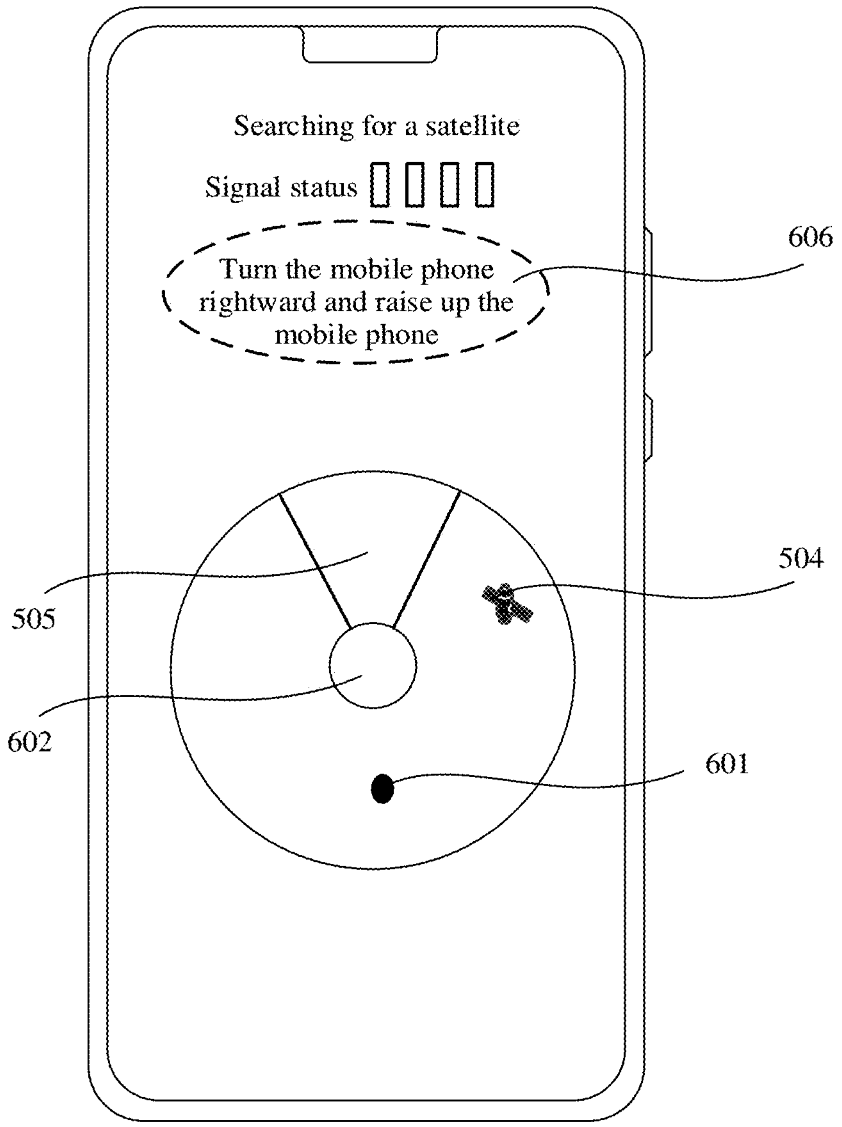
FIG. 9 is a schematic diagram of another satellite-searching guide interface according to an embodiment of this application.

On the satellite-searching guide interface shown in FIG. 9, if the user performs a synchronous operation based on the satellite-searching prompt information "Turn the mobile phone rightward and raise up the mobile phone" to turn the first satellite identifier 504 to the first alignment area 505, and move the second satellite identifier 601 to the second alignment area 602, the interface of the terminal is refreshed accordingly, to display the interface for sending a satellite short message shown in FIG. 7C, and further display the satellite-searching guide interface shown in FIG. 7B.

In the satellite-searching adjustment solution described above, a satellite identifier of only one satellite is displayed on both the satellite-searching guide interface and the interface for sending a satellite short message. Actually, in this application, a quantity of satellites displayed on the satellite-searching guide interface and the interface for sending a satellite short message is not limited. When there are a plurality of satellites that can communicate with the terminal, satellite identifiers of the plurality of satellites may be displayed on the satellite-searching guide interface and the interface for sending a satellite short message. The following describes, by using an example in which satellite identifiers of two satellites are displayed, Solution 10 with reference to Solution 7 in which one satellite is displayed.

Solution 10: A satellite-searching guide interface for adjusting an azimuth first and then adjusting a pitch angle when satellite identifiers of a plurality of satellites are displayed.

Figure 10A:
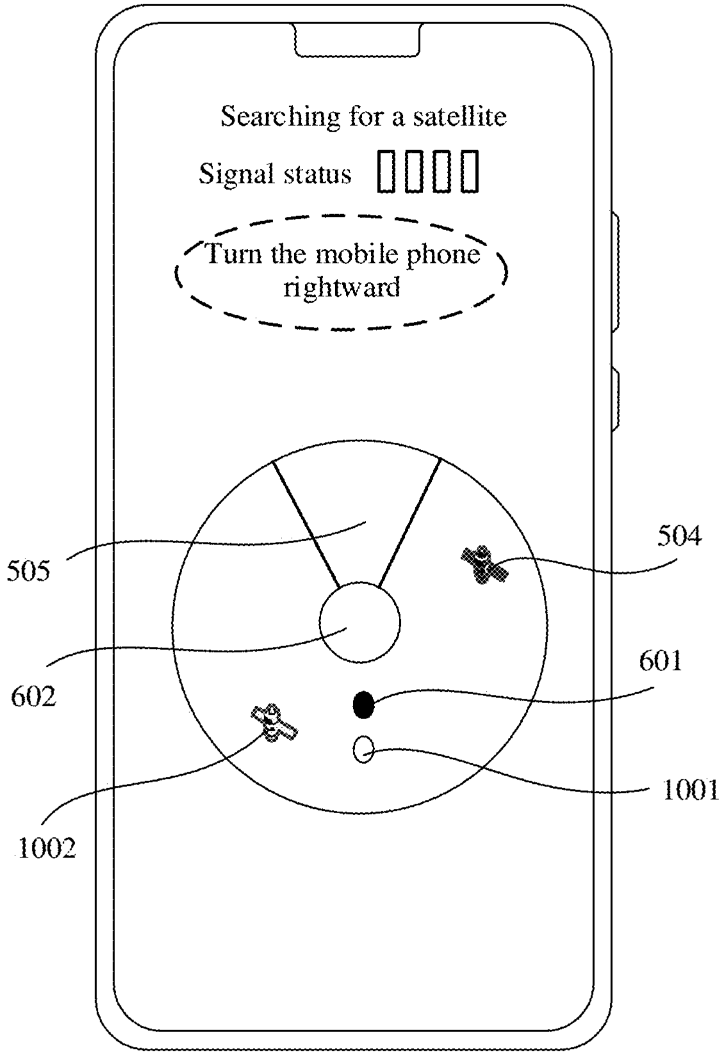
FIG. 10A to FIG. 10D are a schematic diagram of a plurality of satellite-searching guide interfaces according to an embodiment of this application.

The satellite-searching guide interface shown in FIG. 10A includes satellite identifiers of two satellites. The first satellite identifier 504 and the second satellite identifier 601 of a first satellite (the target satellite) have been described above. A first satellite identifier of a second satellite is represented by 1001, and a second satellite identifier of the second satellite is represented by 1002. In the solution shown in FIG. 10A, adjusting the first satellite represented by the first satellite identifier 504 is an optimal solution. Therefore, the terminal provides satellite-searching prompt information "Turn the mobile phone rightward" on the satellite-searching guide interface shown in FIG. 10A.

Figure 10B:
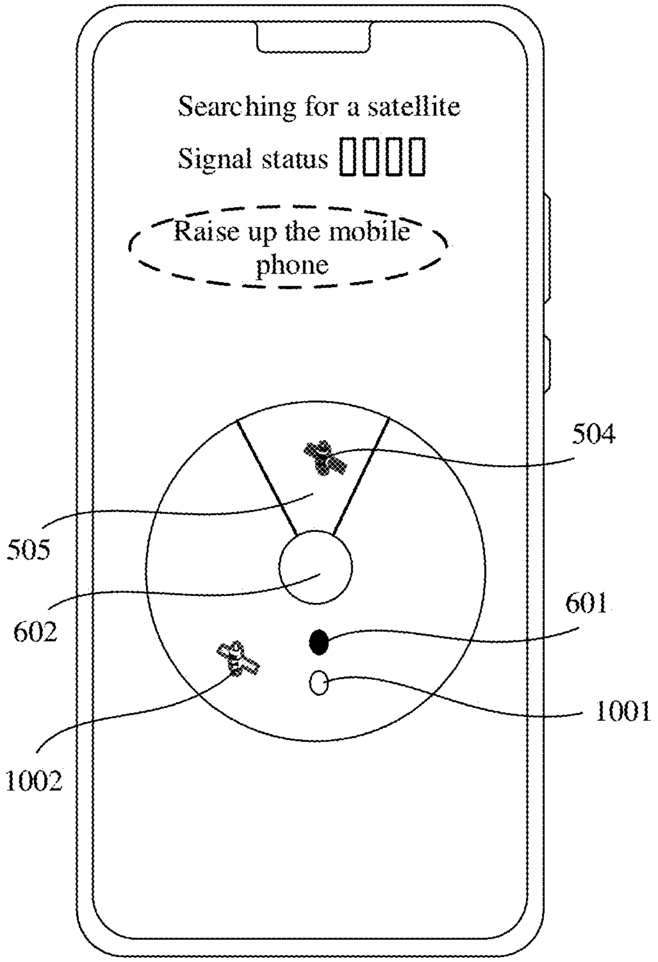
Figure 10C:
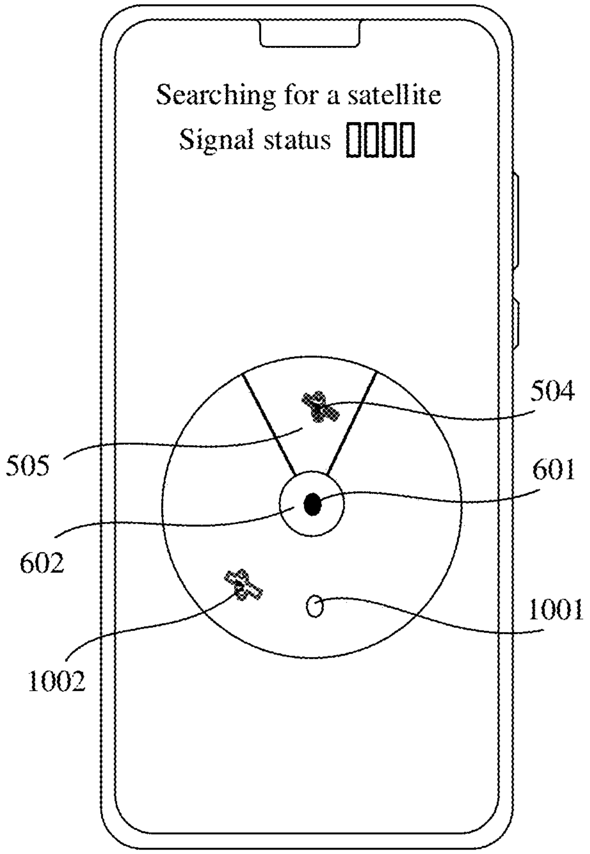
Figure 10D:
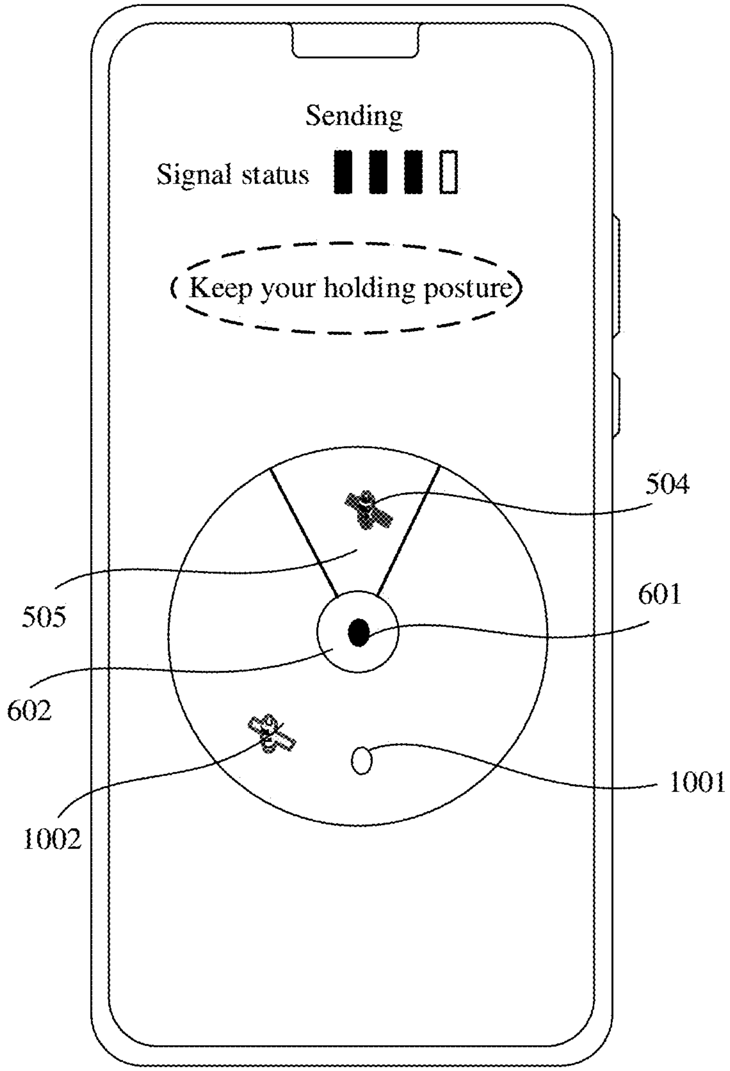

On the basis of FIG. 10A, if the user performs a synchronous operation based on the satellite-searching prompt information "Turn the mobile phone rightward" to turn the first satellite identifier 504 to the first alignment area 505, the interface of the terminal is refreshed accordingly, to display a satellite-searching guide interface shown in FIG. 10B. The satellite-searching prompt information "Raise up a mobile phone" is displayed on the satellite-searching guide interface shown in FIG. 10B. If the user performs an operation based on the satellite-searching prompt information "Raise up a mobile phone" to move the second satellite identifier 601 to the second alignment area 602, the interface of the terminal is refreshed accordingly, to display a satellite-searching guide interface shown in FIG. 10C, and further refresh an interface for sending a satellite short message shown in FIG. 10D.

In Solution 10 described in this embodiment of this application, a first satellite identifier 1001 and a second satellite identifier 1002 of the second satellite are added on the basis of the foregoing Solution 7. Actually, on the basis of other Solutions 1 to 6, Solutions 8 and 9 that are described above except Solution 7, a satellite identifier of another satellite similar to that described in Solution 10 can be added. In addition, the terminal determines the displayed satellite-searching prompt information based on a relationship between the another satellite and the first alignment area. It can be learned that there may be a plurality of satellite-searching guide interfaces and interfaces for sending a satellite short message when there are a plurality of satellites. This is not described one by one in this embodiment of this application. In addition, in this embodiment of this application, different colors may be set before and after the azimuth and the pitch angle are aligned in the first alignment area and the second alignment area in Solution 1 to Solution 10. For both, refer to FIG. 5E and FIG. 5F for understanding. Color filling and change processes are not described one by one in this embodiment of this application.

In this embodiment of this application, after the first satellite message is sent, the method may further include in response to an operation that the user sends the second satellite message, determining a location change after the terminal sends the first satellite message; and if the location change after the terminal sends the first satellite message is less than a first threshold, sending the second satellite message to the target satellite, and skipping displaying the satellite-searching guide interface.

Alternatively, after the first satellite message is sent, the method further includes: in response to an operation that the user sends the second satellite message, determining time when the terminal sends the first satellite message; and if a difference between the time when the terminal sends the first satellite message and time when the user triggers the operation of sending the second satellite message is less than a second threshold, sending the second satellite message to the target satellite, and skipping displaying the satellite-searching guide interface.

Figure 11A:
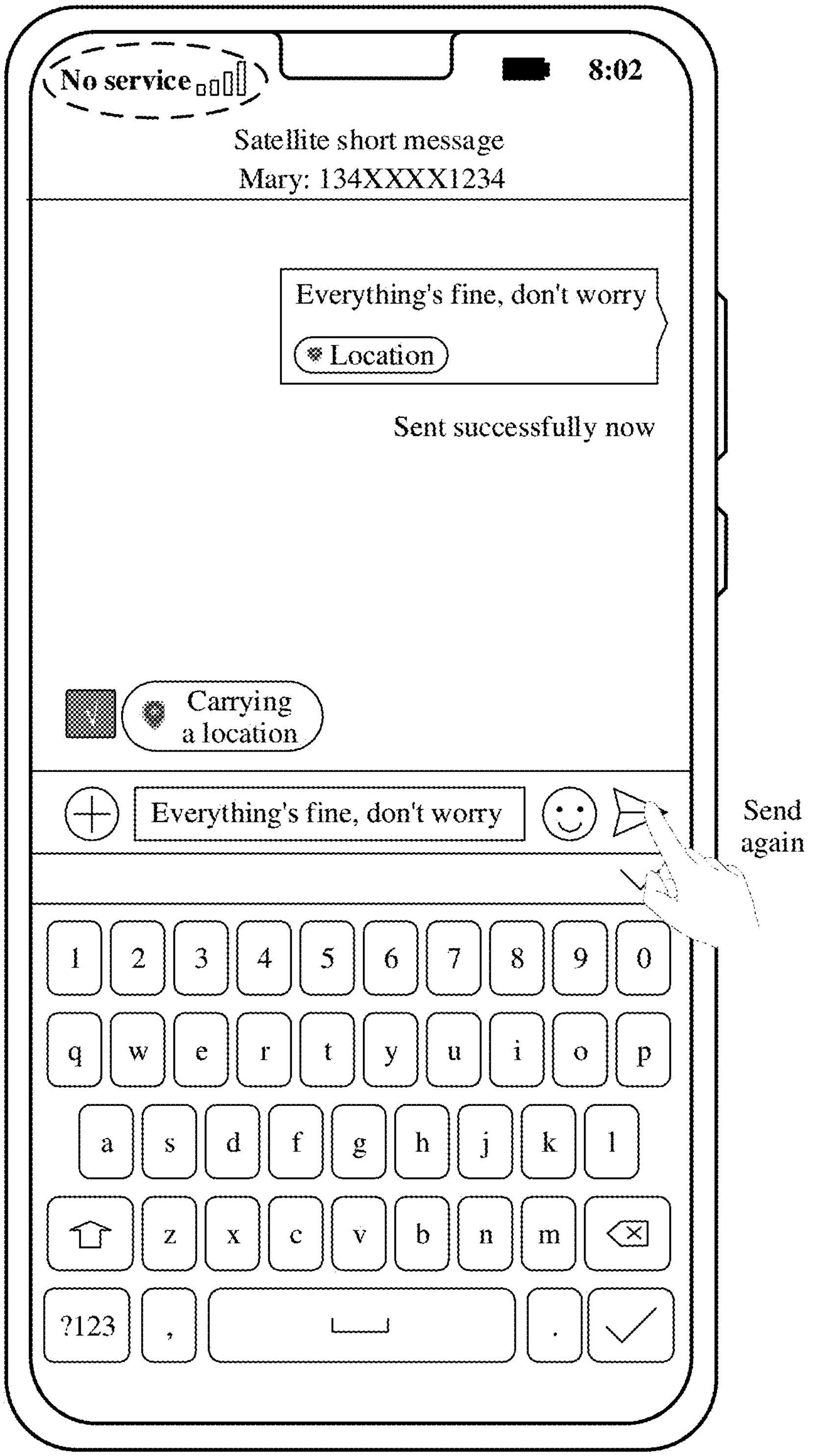
FIG. 11A is a schematic diagram of a satellite message editing interface according to an embodiment of this application.
Figure 11B:
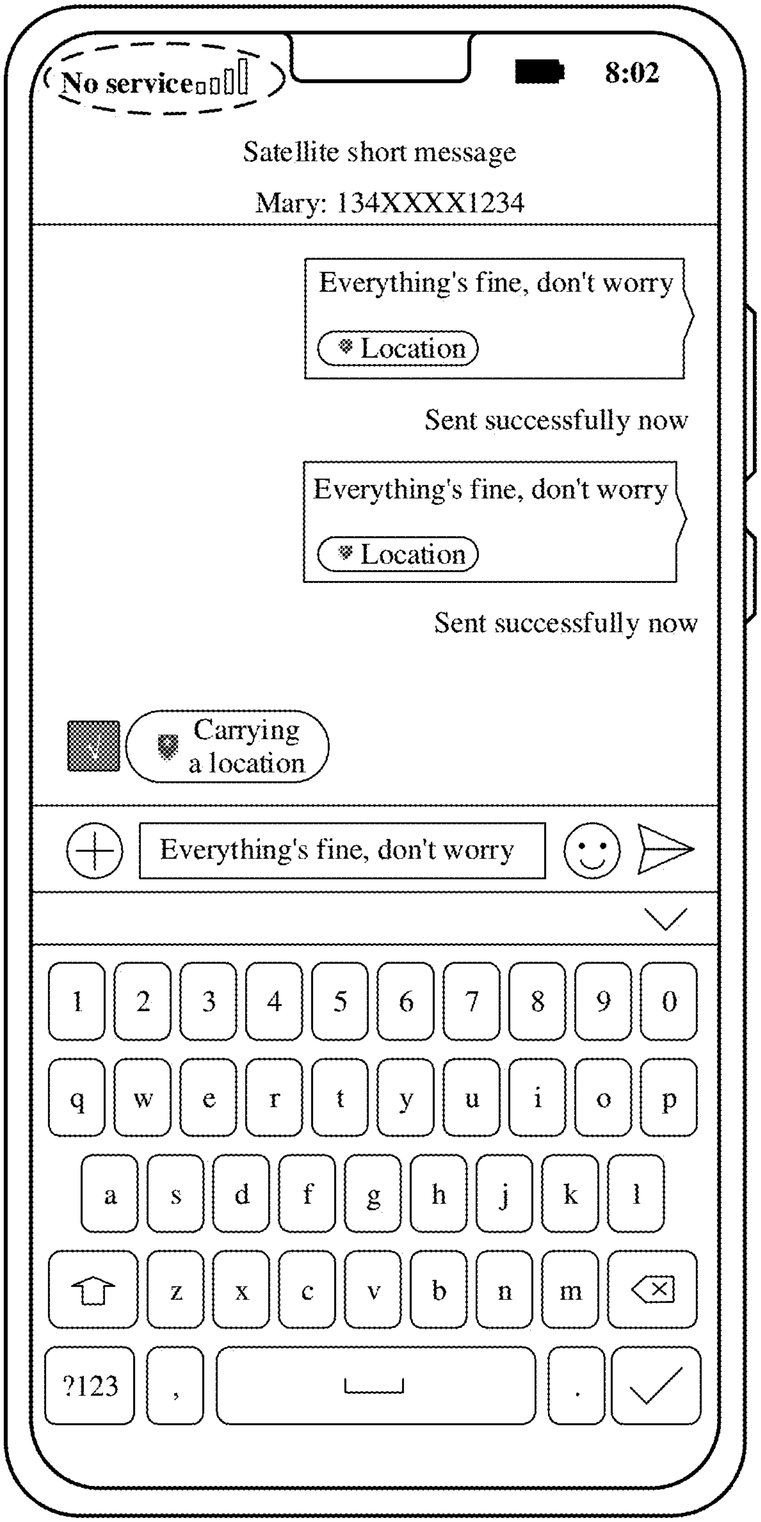
FIG. 11B is a schematic diagram of another satellite message editing interface according to an embodiment of this application.

With reference to the foregoing satellite short message scenario, in this embodiment of this application, after sending the first satellite short message, the terminal may receive a sending success message fed back by the satellite, and may display an interface shown in FIG. 11A for the message sent to the recipient "Mary". If the user concerns that a second terminal cannot successfully receive the second satellite short message, the user may further maintain a posture in which the terminal adjusts the azimuth and the pitch angle to send the second satellite short message to the same recipient again. Because a time interval between sending the second satellite short message this time and sending the satellite short message last time is very small or a location change of the mobile phone is very small, when the satellite short message is sent again, it is unnecessary to go to the satellite-searching guide interface again. When the second satellite short message is also successfully sent, the terminal displays an interface shown in FIG. 11B.

Figure 11C:
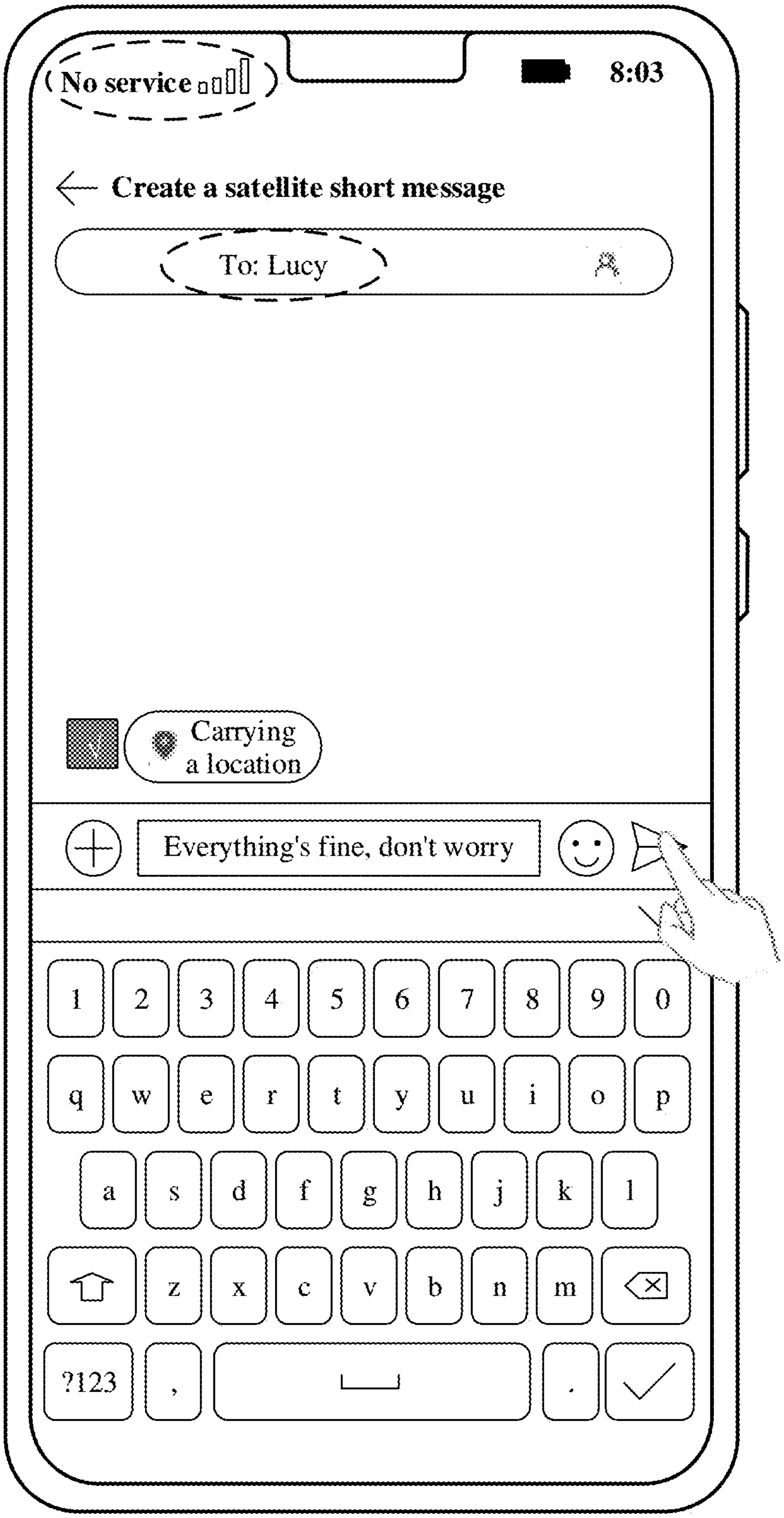
FIG. 11C is a schematic diagram of still another satellite message editing interface according to an embodiment of this application.
Figure 11D:
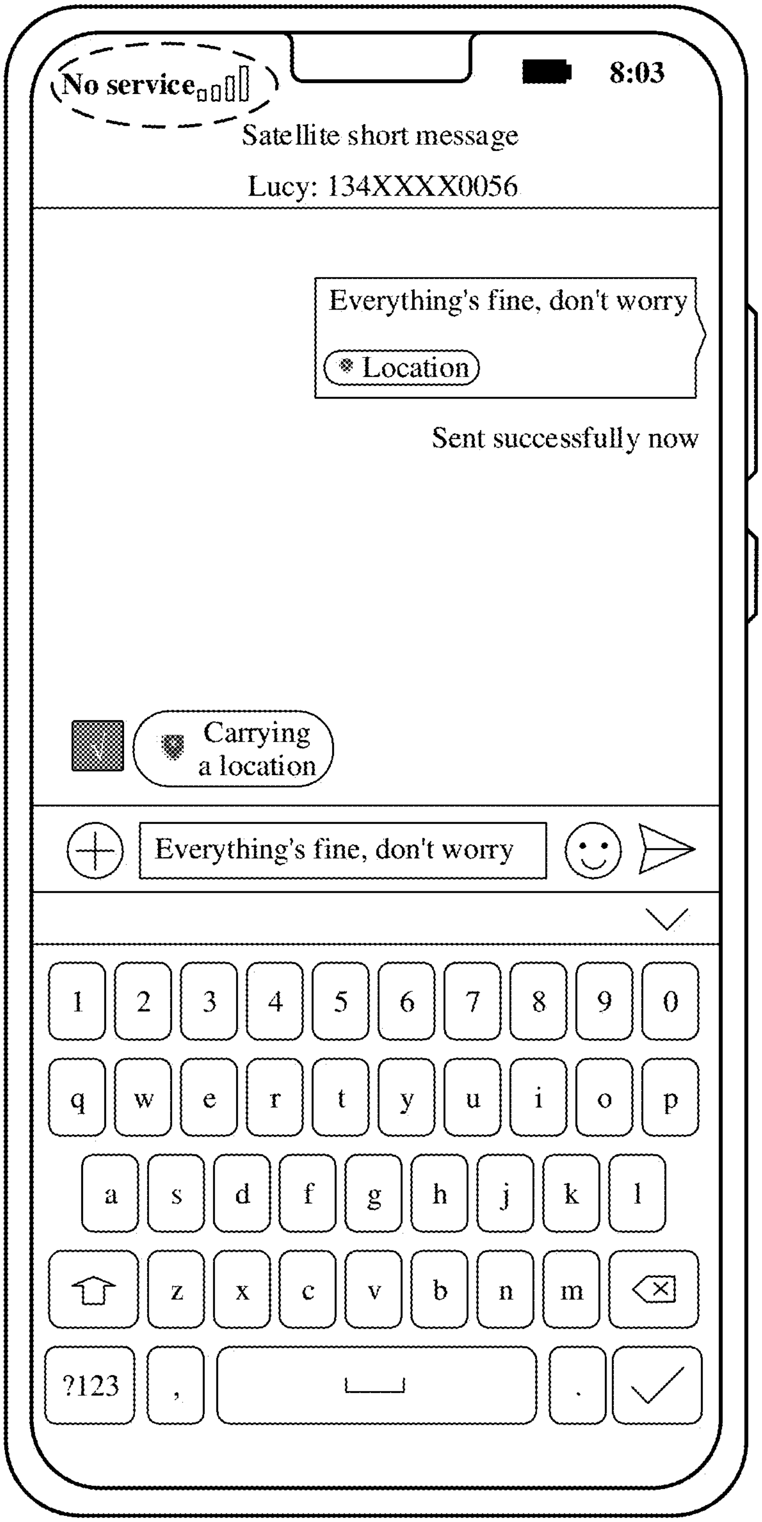
FIG. 11D is a schematic diagram of yet another satellite message editing interface according to an embodiment of this application.

In this embodiment of this application, after sending the first satellite short message, the terminal may further maintain a posture in which the terminal adjusts the azimuth and the pitch angle, and send the second satellite short message to another recipient. As shown in FIG. 11C, the second satellite short message is sent to a recipient "Lucy". Because a time interval between sending the second satellite short message to the recipient "Lucy" and sending the satellite short message to the recipient "Mary" last time is very small, or a location change of the mobile phone is very small, when the second satellite short message is sent to the recipient "Lucy", it is unnecessary to go to the satellite-searching guide interface again. When the second satellite short message is also successfully sent to the recipient "Lucy", the terminal displays an interface shown in FIG. 11D.

FIG. 11A to FIG. 11D are all described cases in which the satellite short message is successfully sent. After the first satellite message is sent to the target satellite, the method further includes: receiving a response message indicating that the first satellite message fails to be sent; and displaying the satellite-searching guide interface based on the response message indicating that the first satellite message fails to be sent.

Figure 11E:
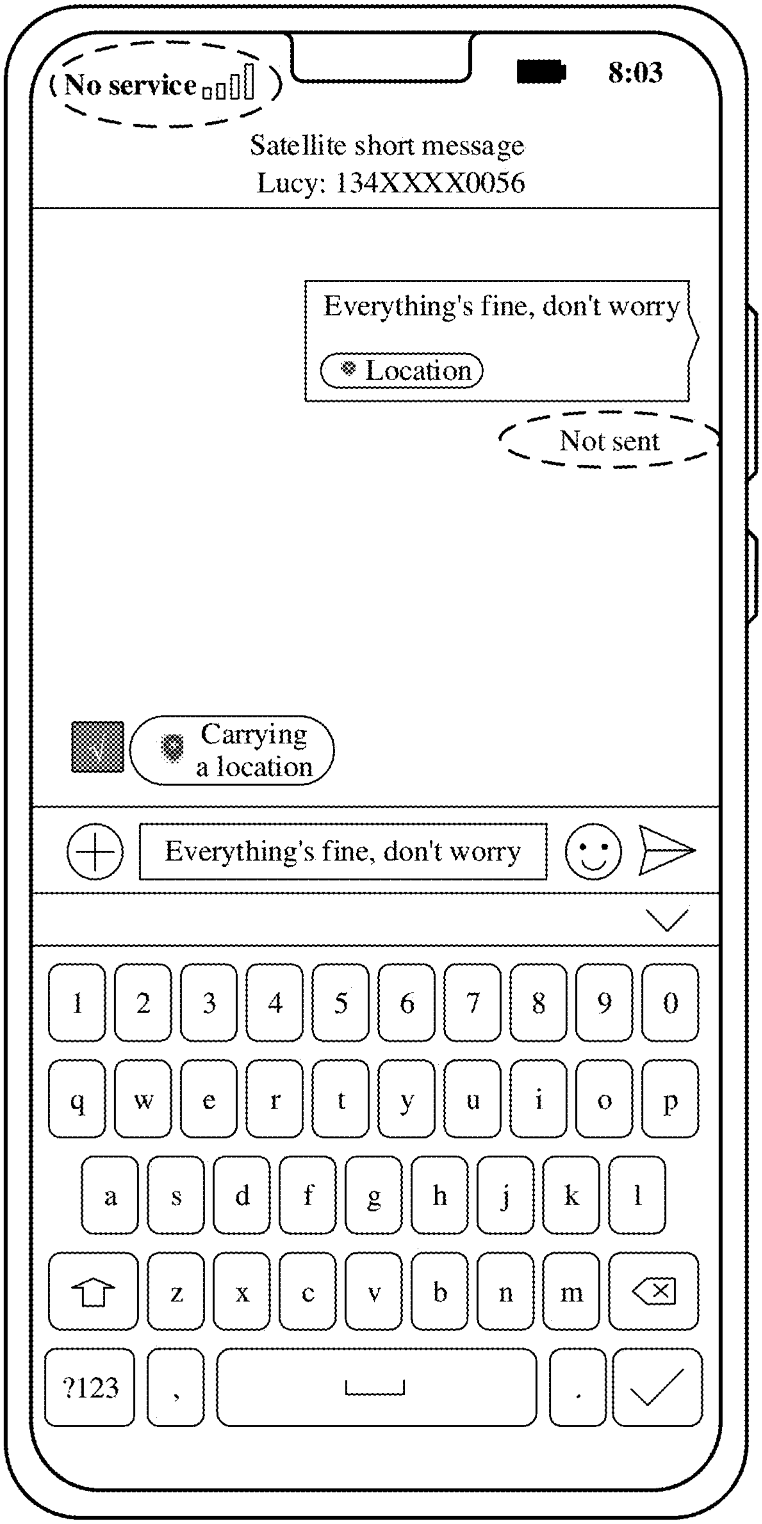
FIG. 11E is a schematic diagram of still yet another satellite message editing interface according to an embodiment of this application.

With reference to the foregoing satellite short message scenario, when the satellite short message fails to be sent, that the second satellite short message fails to be sent to the recipient "Lucy" is used as an example, in which the terminal displays an interface shown in FIG. 11E.

In a sending failure case, the terminal may display the satellite-searching guide interface again, so that the user performs satellite-searching and alignment again. When the sending fails, prompt information "Do you want to replace the satellite?" may be displayed on the display interface of the terminal.

In addition, in this embodiment of this application, a common message that fails to be sent may be further converted into a satellite message for sending. The process may be: before displaying the satellite-searching guide interface, sending the common message to a base station; receiving a response message indicating that the common message fails to be sent; and in response to the response message indicating that the common message fails to be sent, displaying the satellite-searching guide interface.

In the satellite short message scenario, when the common short message fails to be sent, the terminal may automatically switch to sending the satellite short message, automatically fill content of the common short message into an editing area of the satellite short message, and start the satellite searching process described in the foregoing embodiments. Alternatively, when the common short message fails to be sent, the user is prompted to select whether to switch to sending the satellite short message. If the user selects “Yes”, in other words, the user agrees to switch to sending the satellite short message, the terminal automatically fills content of the common short message into an editing area of the satellite short message, and start the satellite-searching process described in the foregoing embodiments.

The foregoing describes the corresponding content of the message sending method, and the following describes a message receiving method.

Figure 12:
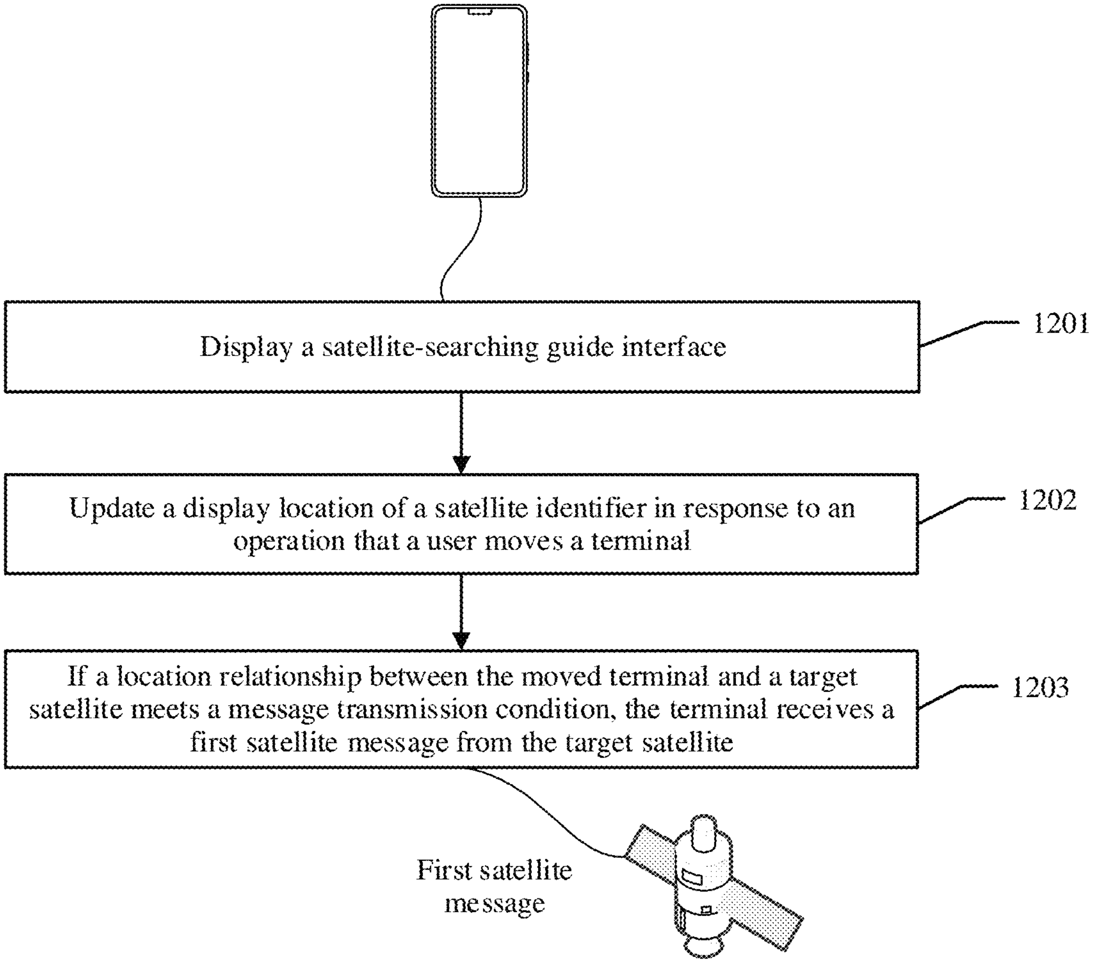
FIG. 12 is a schematic diagram of an embodiment of a message receiving method according to an embodiment of this application.

As shown in FIG. 12, an embodiment of the message receiving method provided in an embodiment of this application may include the following steps.

1201: A terminal displays a satellite-searching guide interface.

The satellite-searching guide interface includes a satellite identifier, and a display location of the satellite identifier on the satellite-searching guide interface indicates a location relationship between the terminal and a target satellite.

1202: The terminal updates the display location of the satellite identifier in response to an operation that a user moves the terminal.

1203: If a location relationship between the moved terminal and the target satellite meets a message transmission condition, the terminal receives a first satellite message from the target satellite.

In this embodiment of this application, the terminal may guide, by using the satellite-searching guide interface, the user to adjust the location relationship between the terminal and the target satellite, so that the terminal can quickly establish a communication connection to the satellite. In this way, the terminal can quickly receive a satellite message.

In this embodiment of this application, both steps 1201 and 1202 may be understood with reference to a corresponding content of the foregoing message receiving method. Details are not described herein again. A difference is that step 1203 is to receive the first satellite message from the target satellite, and step 303 is to send the first satellite message to the target satellite.

Figure 13A:
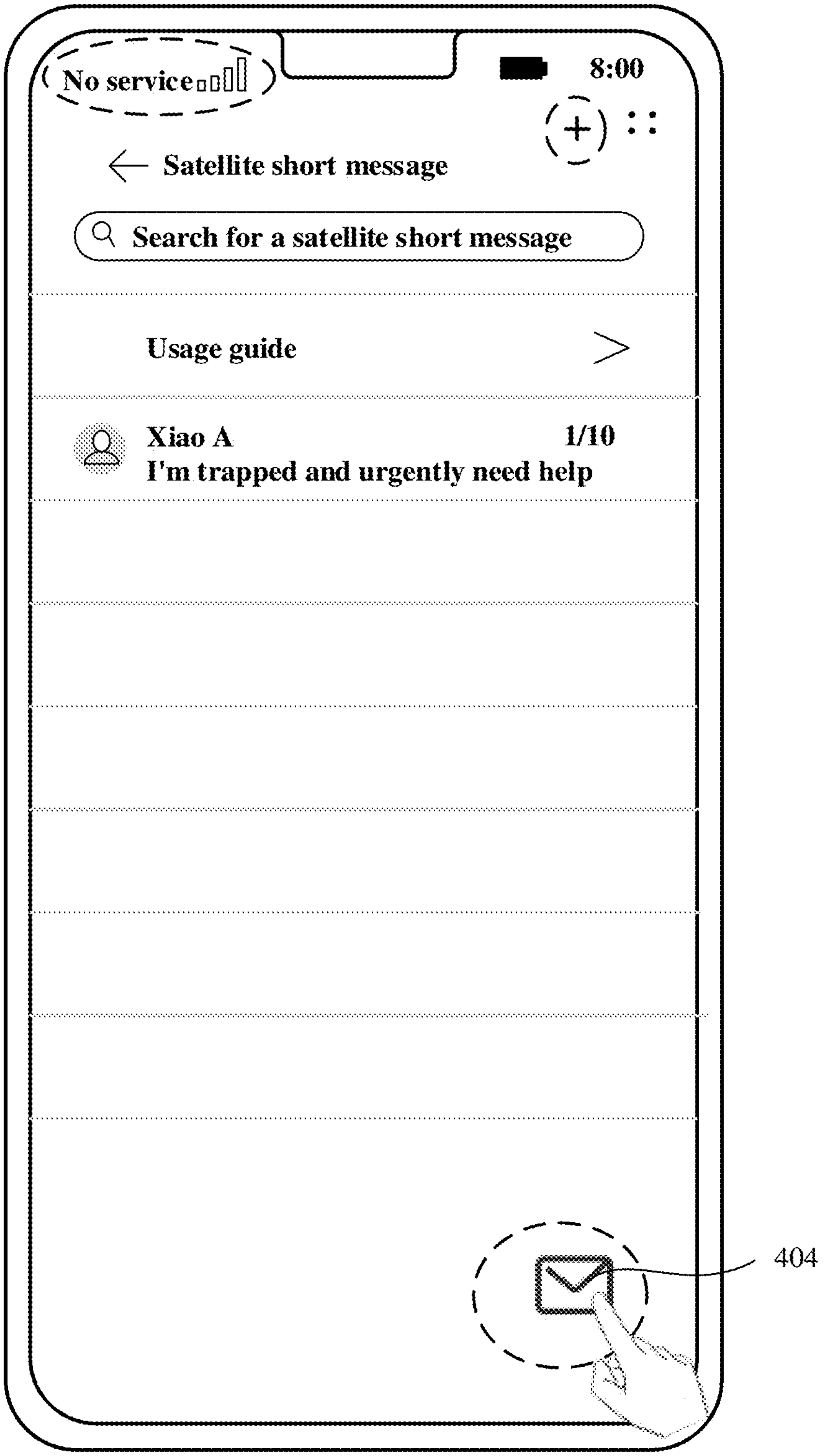
FIG. 13A is a schematic diagram of another interface of a satellite short message according to an embodiment of this application.

In this embodiment of this application, for example, the satellite message is a satellite short message, and an operation of receiving the satellite short message may be performed on an interface shown in FIG. 13A. For example, the loading interface shown in FIG. 5A is started in response to a tap operation performed by the user on the identifier 404 of receiving the satellite short message in FIG. 13A. Alternatively, another satellite-searching guide interface described in the foregoing process of receiving a satellite short message is displayed, and then satellite-searching guide is performed based on Solutions 1 to 10 or other feasible solutions described in the foregoing process of receiving a satellite short message, so that the terminal establishes a communication connection to the satellite, and further receives the satellite short message by using the satellite.

Figure 13B:
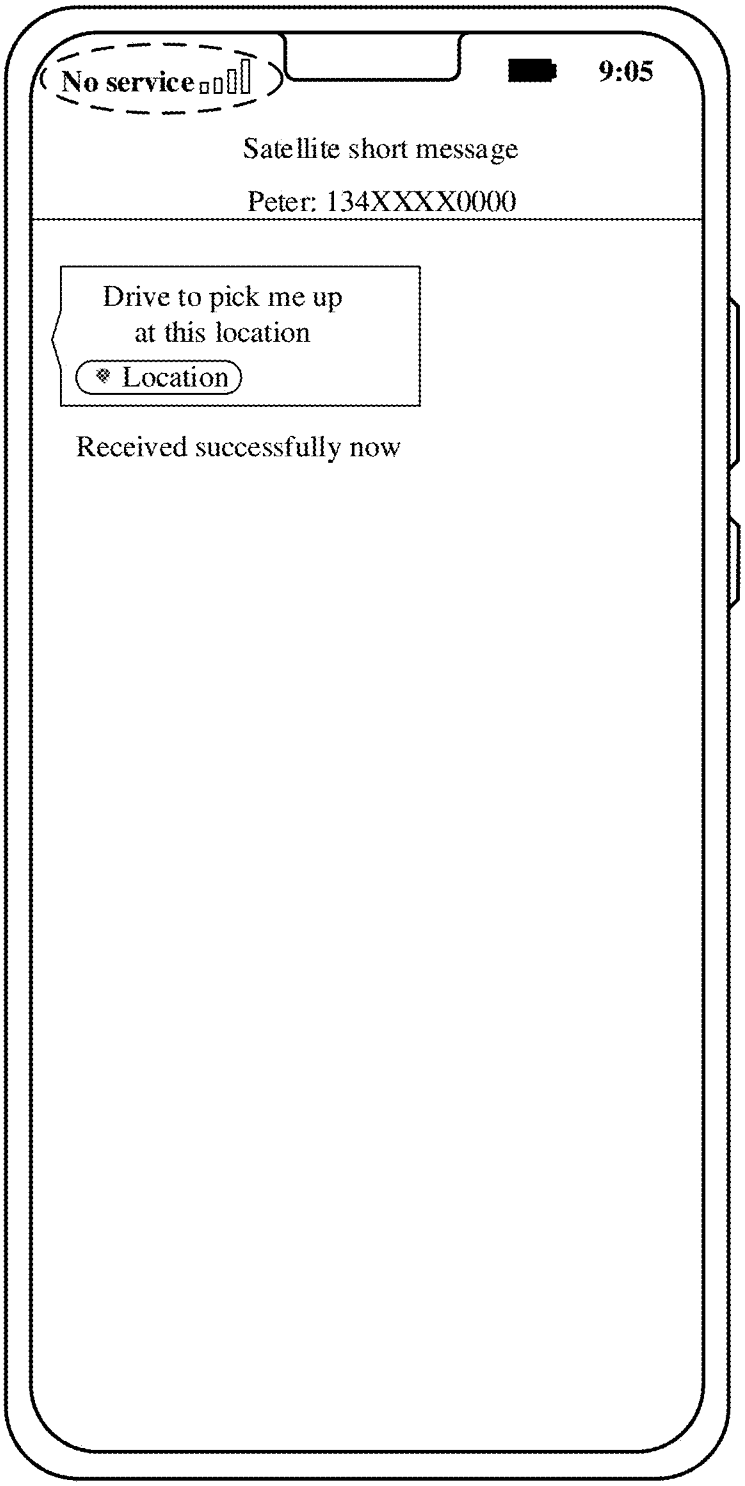
FIG. 13B is a schematic diagram of still another interface of a satellite short message according to an embodiment of this application.

An interface in which the terminal receives a satellite short message may be understood with reference to FIG. 13B. As shown in FIG. 13B, a satellite short message “Drive to pick me up at this location” sent by Peter is received, and the satellite short message further carries location information.

In this embodiment of this application, both the message sending method and the message receiving method may be used to send or receive a message by using a satellite, and alignment between a terminal and a target satellite may be implemented, to increase a success rate of message sending. Especially in an area where a mobile communication signal is weak or a mobile communication signal is unavailable, the success rate of message sending is increased.

The foregoing describes a process of sending a satellite message and a process of receiving a satellite message. The following describes a terminal provided in an embodiment of this application with reference to the accompanying drawings.

Figure 14:
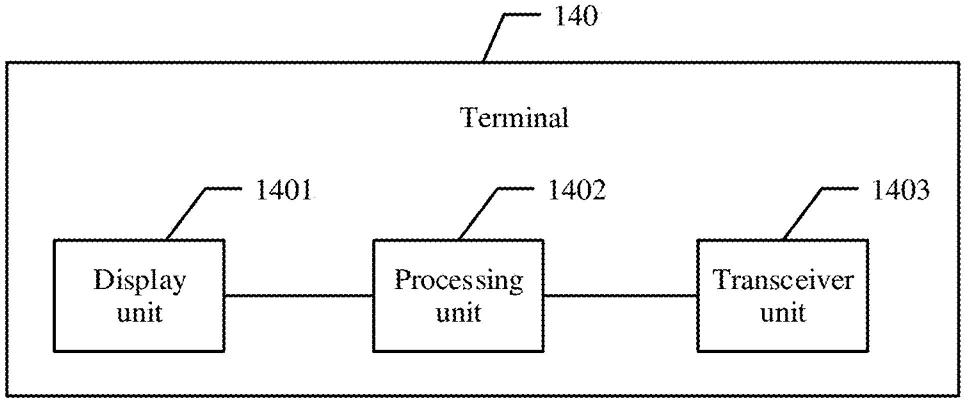
FIG. 14 is a schematic diagram of another structure of a terminal according to an embodiment of this application.

As shown in FIG. 14, a terminal 140 provided in an embodiment of this application includes:

- a display unit 1401, configured to display a satellite-searching guide interface, where the satellite-searching guide interface includes a satellite identifier, and a display location of the satellite identifier on the satellite-searching guide interface indicates a location relationship between the terminal and a target satellite;
- a processing unit 1402, configured to update the display location of the satellite identifier displayed by the display unit 1401 in response to an operation that a user moves the terminal; and
- a transceiver unit 1403, configured to, if the processing unit 1402, in response to a location relationship between the terminal moved by the user and the target satellite, meets a message transmission condition, send a first satellite message to the target satellite or receive a first satellite message from the target satellite.

In this embodiment of this application, the terminal may guide, by using the satellite-searching guide interface, the user to adjust the location relationship between the terminal and the target satellite, so that the terminal can quickly establish a communication connection to the satellite. In this way, the terminal can quickly receive or send a satellite message.

Optionally, the satellite-searching guide interface further includes satellite-searching prompt information, and the satellite-searching prompt information is used to prompt the user of a direction of moving the terminal.

Optionally, the satellite-searching guide interface includes a first satellite-searching guide interface and a second satellite-searching guide interface. The first satellite-searching guide interface includes a first satellite identifier and a first alignment area, the first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite-searching guide interface includes a second satellite identifier and a second alignment area. The second satellite identifier indicates a location relationship between the terminal and the target satellite in a pitch angle, and when the location relationship between the terminal and the target satellite in the pitch angle meets the message transmission condition, the second satellite identifier is located in the second alignment area.

Optionally, the display unit 1401 is specifically configured to display the first satellite-searching guide interface.

The processing unit 1402 is specifically configured to update a display location of the first satellite identifier in response to an operation that the user moves the terminal leftward or rightward.

The display unit 1401 is specifically configured to display the second satellite-searching guide interface when the first satellite identifier is located in the first alignment area.

The processing unit 1402 is specifically configured to update a display location of the second satellite identifier in response to an operation that the user moves the terminal upward or downward.

Optionally, the display unit 1401 is specifically configured to display the second satellite-searching guide interface.

The processing unit 1402 is specifically configured to update the display location of the second satellite identifier in response to the operation that the user moves the terminal upward or downward.

The display unit 1401 is specifically configured to display the first satellite-searching guide interface when the second satellite identifier is located in the second alignment area.

The processing unit 1402 is specifically configured to update the display location of the first satellite identifier in response to the operation that the user moves the terminal leftward or rightward.

Optionally, the satellite-searching guide interface includes a first satellite identifier, a first alignment area, a second satellite identifier, and a second alignment area. The first satellite identifier indicates a location relationship between the terminal and the target satellite in an azimuth, and when the location relationship between the terminal and the target satellite in the azimuth meets the message transmission condition, the first satellite identifier is located in the first alignment area. The second satellite identifier indicates a location relationship between the terminal and the target satellite in a pitch angle, and when the location relationship between the terminal and the target satellite in the pitch angle meets the message transmission condition, the second satellite identifier is located in the second alignment area.

Optionally, the processing unit 1402 is specifically configured to: update the display location of the first satellite identifier in response to the operation that the user moves the terminal leftward or rightward; and update the display location of the second satellite identifier in response to the operation that the user moves the terminal upward or downward.

Optionally, when the display location of the first satellite identifier is outside the first alignment area, the first alignment area is displayed in a first color; and when the display location of the first satellite identifier is in the first alignment area, the first alignment area is displayed in a second color, and the first color is different from the second color.

Optionally, when the display location of the second satellite identifier is outside the second alignment area, the second alignment area is displayed in a third color; and when the display location of the second satellite identifier is in the second alignment area, the second alignment area is displayed in a fourth color, and the third color is different from the fourth color.

Optionally, the display unit 1401 is further configured to: when the terminal is configured to send the first satellite message and before the satellite-searching guide interface is displayed, display a satellite message editing interface in response to an operation that the user creates a satellite message or replies to a satellite message, where the satellite message editing interface is used by the user to input content of the first satellite message.

Optionally, the display unit 1401 is specifically configured to display the satellite-searching guide interface in response to an operation that the user sends the first satellite message.

Optionally, the display unit 1401 is specifically configured to display the satellite-searching guide interface in response to an operation that the user receives a satellite message.

Optionally, the transceiver unit 1403 is further configured to send a common message to a base station, and receive a response message indicating that the common message fails to be sent.

The display unit 1401 is specifically configured to display the satellite-searching guide interface in response to the response message indicating that the common message fails to be sent.

Optionally, the processing unit 1402 is further configured to: in response to an operation that the user sends the second satellite message, determine a location change after the terminal sends the first satellite message.

The transceiver unit 1403 is further configured to: if the location change after the terminal sends the first satellite message is less than a first threshold, send the second satellite message to the target satellite, and skip displaying the satellite-searching guide interface.

Optionally, the transceiver unit 1403 is further configured to receive a response message indicating that the first satellite message fails to be sent.

The display unit 1401 is further configured to display the satellite-searching guide interface based on the response message indicating that the first satellite message fails to be sent.

In this embodiment of this application, operations performed by units in the terminal are similar to those described in embodiments shown in FIG. 3 to FIG. 13B. Details are not described herein again.

In another embodiment of this application, a computer-readable storage medium is further provided. The computer-readable storage medium stores computer executable instructions. When a processor of a terminal executes the computer executable instructions, the terminal performs the steps performed by the terminal device in FIG. 3 to FIG. 13B.

In another embodiment of this application, a computer program product is further provided. The computer program product includes computer program code. When the computer program code is executed on a computer, the computer device performs the steps performed by the terminal in FIG. 3 to FIG. 13B.

In another embodiment of this application, a chip system is further provided. The chip system includes one or more interface circuits and one or more processors. The interface circuit and the processor are interconnected by using a line. The interface circuit is configured to: receive a signal from a memory of a terminal, and send a signal to the processor, where the signal includes computer instructions stored in the memory. When the processor executes the computer instructions, the terminal performs the steps performed by the terminal device in FIG. 3 to FIG. 13B. In a possible design, the chip system may further include a memory. The memory is configured to store program instructions and data that are necessary for controlling the device. The chip system may include a chip, or may include a chip and another discrete component.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. All or some of the foregoing integrated units may be implemented by using software, hardware, firmware, or any combination thereof.

When the integrated units are implemented by using software, all or some of the integrated units may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

What is claimed is:

1. A method, applied to a terminal, the method comprising:

displaying a satellite-searching guide interface, wherein the satellite-searching guide interface comprises a satellite identifier, and a display location of the satellite identifier on the satellite-searching guide interface indicates a location relationship between the terminal and a target satellite;

updating the display location of the satellite identifier in response to an operation that a user moves the terminal;

when the location relationship between the terminal and the target satellite meets a message transmission condition after the updating the display location, sending a first satellite message to the target satellite; and during the sending the first satellite message to the target satellite, displaying first prompting information, wherein the first prompting information is used to prompt the user to maintain a holding posture, wherein displaying the satellite-searching guide interface, and updating the display location of the satellite identifier in response to the operation that the user moves the terminal comprises:

displaying a first satellite-searching guide interface, wherein the first satellite-searching guide interface comprises a first satellite identifier and a first alignment area, and the first satellite identifier indicates the location relationship between the terminal and the target satellite in azimuth;

updating a first display location of the first satellite identifier in response to a first operation that the user moves the terminal leftward or rightward;

displaying a second satellite-searching guide interface after the first satellite identifier is positioned in the first alignment area, wherein the second satellite-searching guide interface comprises a second satellite identifier and a second alignment area, and the second satellite identifier indicates the location relationship between the terminal and the target satellite in a pitch angle; and updating a second display position of the second satellite identifier in response to a second operation that the user moves the terminal upward or downward.

2. The method according to claim 1, wherein the message transmission condition includes at least one of the first satellite identifier being located in the first alignment area or the second satellite identifier being located in the second alignment area.

3. The method according to claim 1, wherein the satellite-searching guide interface displays at least one of: satellite-searching prompt information prompting the user to move leftward or rightward, satellite-searching prompt information prompting the user to move upward or downward, or third prompt information indicating that the terminal is searching for satellite signals, and wherein the satellite-searching guide interface further displays satellite-searching status information.

4. The method according to claim 1, wherein:

when the display location of the first satellite identifier is outside the first alignment area, the first alignment area is displayed in a first color; and when the display location of the first satellite identifier is in the first alignment area, the first alignment area is displayed in a second color, and the first color is different from the second color.

5. The method according to claim 1, wherein displaying the satellite-searching guide interface comprises:

displaying the satellite-searching guide interface in response to an operation that the user sends the first satellite message.

6. A terminal, comprising:

a transceiver;

at least one processor; and a memory, wherein the transceiver and the at least one processor are coupled to the memory, the memory is configured to store a program or instructions, and when the program or the instructions are executed by the at least one processor, the terminal is enabled to perform operations including:

displaying a satellite-searching guide interface, wherein the satellite-searching guide interface comprises a satellite identifier, and a display location of the satellite identifier on the satellite-searching guide interface indicates a location relationship between the terminal and a target satellite;

updating the display location of the satellite identifier in response to an operation that a user moves the terminal;

when the location relationship between the terminal and the target satellite meets a message transmission condition after the updating the display location, sending a first satellite message to the target satellite; and during the sending the first satellite message to the target satellite, displaying first prompting information, wherein the first prompting information is used to prompt the user to maintain a holding posture, wherein displaying the satellite-searching guide interface, and updating the display location of the satellite identifier in response to the operation that the user moves the terminal comprises:

displaying a first satellite-searching guide interface, wherein the first satellite-searching guide interface comprises a first satellite identifier and a first alignment area, and the first satellite identifier indicates the location relationship between the terminal and the target satellite in azimuth;

updating a first display location of the first satellite identifier in response to a first operation that the user moves the terminal leftward or rightward;

displaying a second satellite-searching guide interface after the first satellite identifier is positioned in the first alignment area, wherein the second satellite-searching guide interface comprises a second satellite identifier and a second alignment area, and the second satellite identifier indicates the location relationship between the terminal and the target satellite in a pitch angle; and updating a second display position of the second satellite identifier in response to a second operation that the user moves the terminal upward or downward.

7. The terminal according to claim 6, wherein the satellite-searching guide interface displays at least one of: satellite-searching prompt information prompting the user to move leftward or rightward, satellite-searching prompt information prompting the user to move upward or downward, or third prompt information indicating that the terminal is searching for satellite signals, and wherein the satellite-searching guide interface further displays satellite-searching status information.

8. The method according to claim 1, further comprising:

during the sending the first satellite message to the target satellite, displaying at least one of:

signal status;

sending status; or the satellite identifier and an alignment area.

9. The method according to claim 1, further comprising:

during the sending the first satellite message to the target satellite, displaying an interface for sending the first satellite message, the interface for sending the first satellite message comprising the first prompting information.

10. The method according to claim 1, before sending the first satellite message to the target satellite, the method further comprising:

displaying an interface for creating a satellite short message, wherein the interface for creating the satellite short message comprises a first identifier for the terminal carrying a location, wherein, in response to selecting the first identifier, the first satellite message comprises a current location of the terminal.

11. The method according to claim 1, the terminal comprising a message application, the method further comprising:

displaying a satellite short message interface of the message application, in response to a tap operation performed by the user on a satellite short message function item of the message application; and displaying the satellite-searching guide interface in response to a tap operation performed by the user on a sending button on the satellite short message interface.

12. The method according to claim 1, wherein the second satellite-searching guide interface does not include the first satellite identifier and the first alignment area, or wherein the first satellite-searching guide interface does not include the second satellite identifier and the second alignment area.

13. The method according to claim 1, wherein the first satellite identifier being in the first alignment area indicates that the location relationship between the terminal and the target satellite meets the message transmission condition in the azimuth, or wherein the second satellite identifier being in the second alignment area indicates that the location relationship between the terminal and the target satellite meets the message transmission condition in the pitch angle.

14. The method according to claim 1, wherein:

when a second display location of the second satellite identifier is outside the second alignment area, the second alignment area is displayed in a third color; and when the second display location of the second satellite identifier is in the second alignment area, the second alignment area is displayed in a fourth color, and the third color is different from the fourth color.

15. The method according to claim 1, wherein the first satellite-searching guide interface comprises a first disk area, wherein the first satellite identifier is displayed in the first disk area, and wherein the first alignment area represented by a sector is displayed in the first disk area.

16. The method according to claim 1, wherein the second alignment area is represented by a second disk area, and a location of the second disk area and the second satellite identifier are displayed based on a pitch direction of the target satellite relative to the terminal.

17. The terminal according to claim 6, before sending the first satellite message to the target satellite, the operations further comprising:

displaying an interface for creating a satellite short message, wherein the interface for creating the satellite short message comprises a first identifier for the terminal carrying a location, wherein, in response to selecting the first identifier, the first satellite message comprises a current location of the terminal.

18. The terminal according to claim 6, wherein the second satellite-searching guide interface does not include the first satellite identifier and the first alignment area, or wherein the first satellite-searching guide interface does not include the second satellite identifier and the second alignment area.

19. The terminal according to claim 6, wherein:

when a second display location of the second satellite identifier is outside the second alignment area, the second alignment area is displayed in a third color; and when the second display location of the second satellite identifier is in the second alignment area, the second alignment area is displayed in a fourth color, and the third color is different from the fourth color.

20. The terminal according to claim 6, wherein the first satellite-searching guide interface comprises a first disk area, wherein the first satellite identifier is displayed in the first disk area, and wherein the first alignment area represented by a sector is displayed in the first disk area.

21. The terminal according to claim 6, wherein the second alignment area represented by a second disk, and the location of the second disk and the second satellite identifier are displayed based on a pitch direction of the target satellite relative to the terminal.

22. A method, applied to a terminal, the method comprising:

displaying a satellite-searching guide interface, wherein the satellite-searching guide interface comprises satellite identifiers, and display locations of the satellite identifiers on the satellite-searching guide interface indicate a location relationship between the terminal and a target satellite;

updating a display location of the satellite identifiers in response to an operation that a user moves the terminal;

when the location relationship between the terminal and the target satellite meets a message transmission condition after the updating the display location, sending a first satellite message to the target satellite; and during the sending the first satellite message to the target satellite, displaying first prompting information, wherein the first prompting information is used to prompt the user to maintain a holding posture, the satellite-searching guide interface comprises a first satellite identifier, a first alignment area, a second satellite identifier, and a second alignment area, the first satellite identifier indicates the location relationship between the terminal and the target satellite in an azimuth, and when the location relationship between the terminal and the target satellite in the azimuth meets the message transmission condition, the first satellite identifier is located in the first alignment area, and the second satellite identifier indicates the location relationship between the terminal and the target satellite in a pitch angle, and when the location relationship between the terminal and the target satellite in the pitch angle meets the message transmission condition, the second satellite identifier is located in the second alignment area.

23. The method according to claim 22, before sending the first satellite message to the target satellite, the method further comprising:

displaying an interface for creating a satellite short message, wherein the interface for creating the satellite short message comprises a first identifier for the terminal carrying a location, wherein, in response to selecting the first identifier, the first satellite message comprises a current location of the terminal.

24. The method according to claim 22, wherein the satellite-searching guide interface comprises a first disk area, wherein the first satellite identifier is displayed in the first disk area, and wherein the first alignment area represented by a sector is displayed in the first disk area.

25. The method according to claim 22, wherein the second alignment area is represented by a second disk area, and a location of the second disk area and the second satellite identifier are displayed based on a pitch direction of the target satellite relative to the terminal.

* * * * *